United States Patent
Alomoush et al.

(10) Patent No.: US 11,769,033 B2
(45) Date of Patent: Sep. 26, 2023

(54) SYSTEM, COMPUTER READABLE STORAGE MEDIUM, AND METHOD FOR SEGMENTATION AND ENHANCEMENT OF BRAIN MRI IMAGES

(71) Applicant: Imam Abdulrahman Bin Faisal University, Dammam (SA)

(72) Inventors: Waleed Khamees Ali Alomoush, Dammam (SA); Ayat Ahmad Meqbel Alrosan, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 281 days.

(21) Appl. No.: 17/336,824

(22) Filed: Jun. 2, 2021

(65) Prior Publication Data
US 2022/0405544 A1 Dec. 22, 2022

(51) Int. Cl.
*G06N 3/00* (2023.01)
*G06N 3/006* (2023.01)
*G06T 7/174* (2017.01)

(52) U.S. Cl.
CPC ............ *G06N 3/006* (2013.01); *G06T 7/174* (2017.01); *G06T 2207/10088* (2013.01); *G06T 2207/30016* (2013.01)

(58) Field of Classification Search
CPC ...................................................... G06N 3/006
See application file for complete search history.

(56) References Cited

U.S. PATENT DOCUMENTS 6,904,306 B1 * 6/2005 Wu ..................... A61B 5/055
600/420
2006/0239519 A1 * 10/2006 Nowinski ............... G06T 7/187
382/128
(Continued)

FOREIGN PATENT DOCUMENTS

| CN | 109086831 A | 12/2018 |
| CN | 111982118 A | 11/2020 |
| IN | 201641011787 A | 10/2017 |

OTHER PUBLICATIONS

A. Jayanth et al. "Classification of remote sensed data using Artificial Bee Colony algorithm" The Egyptian Journal of Remote Sensing and Space Sciences (2015) 18, 119-126 (Year: 2015).*
(Continued)

*Primary Examiner* — Oneal R Mistry
(74) *Attorney, Agent, or Firm* — Oblon, McClelland, Maier & Neustadt, L.L.P.

(57) ABSTRACT

A system and method of 3-D image segmentation of brain images includes obtaining a 3-D MRI image, an employee phase including performing search cycles of generating solutions in a neighborhood, taking into account (a) movement of a bee's current location toward a mean value of a positive direction of a global best location and a positive direction of its own best location, (b) movement of the bee's current location toward the mean value of the positive direction of its own best location and a negative direction of the global best location, and (c) a random number, calculating a fitness value for the solutions based on membership values of pixels and distances between the pixels to cluster centers of pixels until search ends. Image segmentation of the image is performed using centers of clusters.

18 Claims, 30 Drawing Sheets

(56) References Cited

U.S. PATENT DOCUMENTS

2015/0329646 A1* 11/2015 Brokopp .................. A61P 7/04
                                                    435/375
2020/0034948 A1*  1/2020 Park ....................... G06N 3/047

OTHER PUBLICATIONS

B. Menon. "Brain Tumor Segmentation in MRI Images using unsupervised Artificial Bee Colony Algorithm and FCM Clustering" IEEE ICCSP 2015 (Year: 2015).*

Liling Sun, et al., "Artificial Bee Colony Algorithm Based on K-Means Clustering for Multiobjective Optimal Power Flow Problem", Hindawi Publishing Corporation, Mathematical Problems in Engineering, Article ID 762853, May 4, 2015, 18 pages.

Wenjie Yu, et al., "An Improved Artificial Bee Colony Algorithm Based on Factor Library and Dynamic Search Balance", Hindawi, Mathematical Problems in Engineering, Article ID 3102628, 2018, 16 pages.

Mohammad Shokouhifar, et al., "An Artificial Bee Colony Optimization for MRI Fuzzy Segmentation of Brain Tissue", 2011 International Conference On Management and Artificial Intelligence, IPEDR, vol. 6, 2011, pp. 6-10.

Dervis Karaboga, et al., "A comprehensive survey: artificial bee colony (ABC) algorithm and applications", Artif Intell Rev, Mar. 11, 2012, 37 pages.

Mutasem K. Alsmadi, "MRI Brain Segmentation Using a Hybrid Artificial Bee Colony Algorithm with Fuzzy-C Mean Algorithm", Journal of Applied Sciences, vol. 15, No. 1, 2015, pp. 100-109.

Ayat Alrosan, et al., "An improved artificial bee colony algorithm based on mean best-guided approach for continuous optimization problems and real brain MRI images segmentation", Neural Computing and Applications, 2020, 27 pages.

* cited by examiner

```
    Initialization
1:  Initialize positions of food sources using Eq1.
2:  Cycle=1
3:  For each food source(i)
3:  Counter(i)=0
4:  End
5:  Repeat /* Employee phase*/
6:  FOR each employee bee(i)
7:  Generate new solutions v_ij in the neighborhood of x_ij using Eq2.
8:    If fit(v_ij) ≥ fit(x_ij)
9:       Change x_ij by v_ij
10:      Counter(i)=0
11:   Else
12:      Counter(i)= Counter(i)+1
12:   End if
13: End for
    /*Onlooker Phase*/
14: Calculate probability P_i for the solutions by Eq4.
15: FOR each food source(i)
16: Select a solution depending on P_i.
17: Generate new solution v_ij(o) in the neighborhood of x_ij(o) using Eq2.
18: Evaluate new solution v_ij(o)
19: If fit(v_ij(o)) ≥ fit(x_ij(o))
20:      Change x_ij(o) by v_ij(o)
21:      Counter(i)=0
22:   Else
23:      Counter(i)= Counter(i)+1
23:   End if
24: End for
    /*Scouts phase*/
25: FOR each food source(i)
26: If Counter(i)>limit
27: Abandon the food source(i)
28: Generate new solutions using Eq1.
10: Memorize the best solution achieved so far.
11: Cycle=Cycle+1
12: Until termination criteria are reached
```

FIG. 2

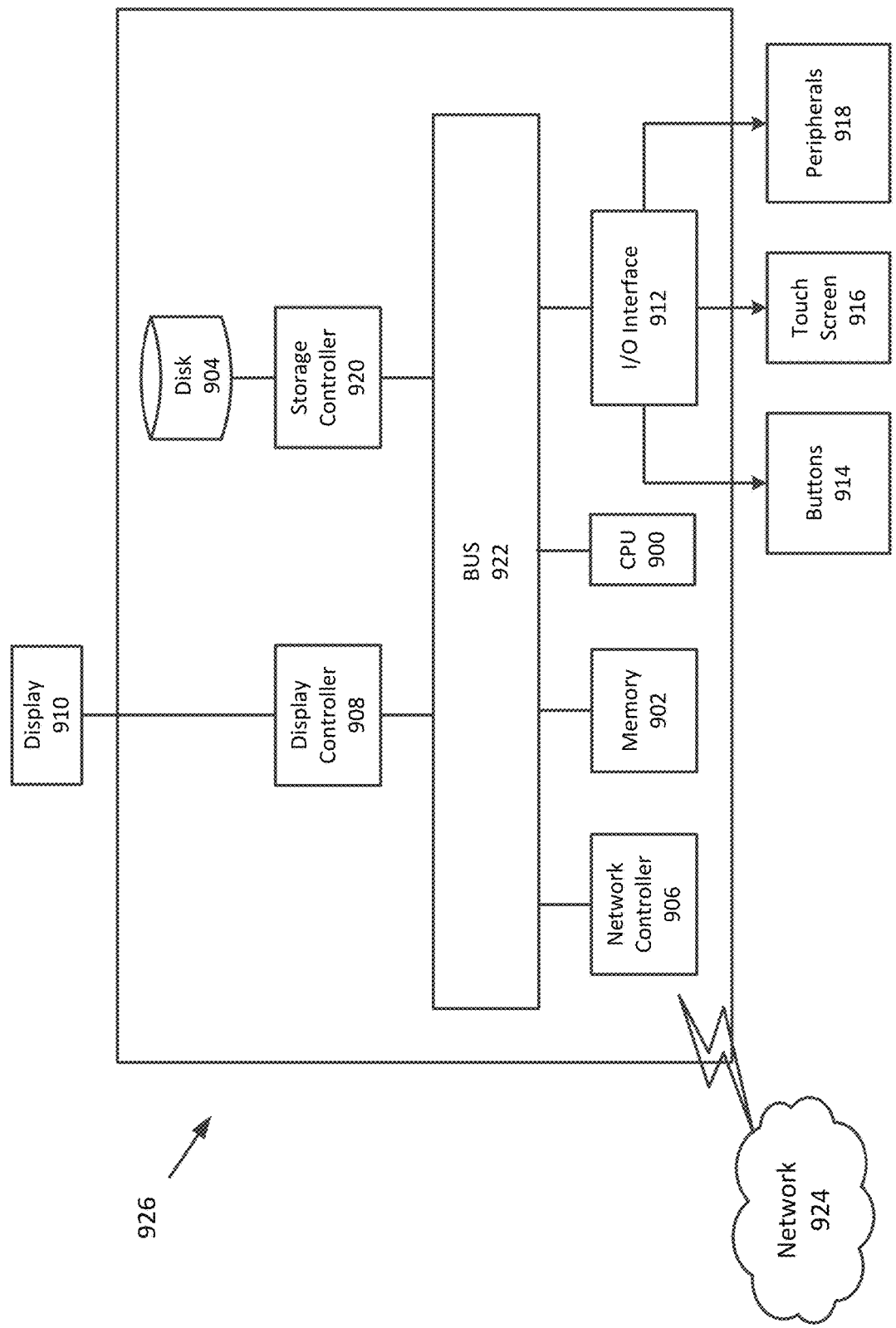

MeanABC

```
    Initialization
1:  Initialize positions of food sources using Eq1.
2:  Cycle=1
2:  For each food source(i)
3:  Counter(i)=0
4:  End
5:  Repeat /* Employee phase*/
6:  FOR each employee bee(i)
7:  Generate new solutions v_ij in the neighborhood of x_ij using Eq5
```

$$v_{ij} = \varphi_{ij}(g - x_{ij}) + \psi_{ij}\left[\left(\frac{pbest_i + gbest}{2} - x_{ij}\right) + \left(\frac{pbest_i - gbest}{2} - x_{ij}\right)\right]$$

```
8:   If fit(v_ij) ≥ fit(x_ij)
9:       Change x_ij by v_ij
10:      Counter(i)=0
11:  Else
12:      Counter(i)= Counter(i)+1
13:  End if
     End for
     /*Onlooker Phase*/
14:  Calculate probability P_i for the solutions by Eq4.
15:  FOR each food source(i)
16:  Select a solution depending on P_i.
17:  Generate new solution v_ij(o) in the neighborhood of x_ij(o) using Eq5.
18:  Evaluate new solution v_ij(o)
19:  If fit(v_ij(o)) ≥ fit(x_ij(o))
20:      Change x_ij(o) by v_ij(o)
21:      Counter(i)=0
22:  Else
23:      Counter(i)= Counter(i)+1
         End if
24:  End for
     /*Scouts phase*/
25:  FOR each food source(i)
26:  If Counter(i)>limit
27:  Abandon the food source(i)
28:  Generate new solutions using Eq1.
10:  Memorize the best solution achieved so far.
11:  Cycle=Cycle+1
12:  Until termination criteria are reached
```

FIG. 5

Hybrid MeanABC + FCM Algorithm

| | |
|---|---|
| 1: | Initialization<br>The centroids value is initialized by Eq<br>$C_i = C_{low} + rand(0,1)*(C_{high}-C_{low}); \quad i=1,2,...,Np$ |
| 2: | Cycle=1 |
| 3: | For each food source(i) |
| 4: | Counter(i)=0 |
| 5: | End |
| | Repeat /* Employee phase*/ |
| 6: | FOR each employee bee(i) |
| 7: | Generate new solutions $v_{ij}$ in the neighborhood of $x_{ij}$ using Eq5 |
| 8: | Calculate the membership matrix $h_{kj}$ using Eq |
| 9: | $$h_{kj} = \mu_{kj} - \frac{1-\mu_{kj}}{2}$$ |
| | Calculate the fitness value fit for the new solution by Eq |
| | $$J_i = \sum_{j=1}^{n} \sum_{k \in C_j} h_{kj}^2 * D_{kj} \quad \text{and} \quad fit_i = \frac{1}{1+J_i} \quad J_i > 0$$ |
| 10: | If $fit(v_{ij}) \geq fit(x_{ij})$ |
| 11: | Change $x_{ij}$ by $v_{ij}$ |
| 12: | Counter(i)=0 |
| 13: | Else |
| 14: | Counter(i)= Counter(i)+1 |
| 15: | End if |
| 16 | End for |
| | /*Onlooker Phase*/ |
| 17: | Calculate probability $P_i$ for the solutions by Eq4. |
| 18: | FOR each food source(i) |
| 19: | Select a solution depending on $P_i$. |
| 20: | Generate new solution $v_{ij(o)}$ in the neighborhood of $x_{ij(o)}$ using Eq5. |
| 21: | Evaluate new solution $v_{ij(o)}$ |
| 22: | Calculate the membership matrix $h_{kj}$ using Eq |
| | $$h_{kj} = \mu_{kj} - \frac{1-\mu_{kj}}{2}$$ |
| 23: | Calculate the fitness value fit for the new solution by Eq |
| | $$J_i = \sum_{j=1}^{n} \sum_{k \in C_j} h_{kj}^2 * D_{kj} \quad \text{and} \quad fit_i = \frac{1}{1+J_i} \quad J_i > 0$$ |
| 24: | If $fit(v_{ij(o)}) \geq fit(x_{ij(o)})$ |
| 25: | Change $x_{ij(o)}$ by $v_{ij(o)}$ |
| 26: | Counter(i)=0 |
| 27: | |
| 28: | Else |
| 29: | Counter(i)= Counter(i)+1 |
| 30 | End if<br>End for |
| | /*Scouts phase*/ |
| 31: | FOR each food source(i) |
| 32: | If Counter(i)>limit |
| 33: | Abandon the food source(i) |
| 34: | Generate new solutions using Eq<br>$C_i = C_{low} + rand(0,1)*(C_{high}-C_{low}); \quad i=1,2,...,Np$ |
| 35: | Memorise the best solution achieved so far. |
| 36: | Cycle=Cycle+1 |
| 37: | Until termination criteria are reached |
| 38: | Do the segmentation image by the optimal cluster centers for FCM. |

FIG. 10

SYSTEM, COMPUTER READABLE STORAGE MEDIUM, AND METHOD FOR SEGMENTATION AND ENHANCEMENT OF BRAIN MRI IMAGES

STATEMENT REGARDING PRIOR DISCLOSURE BY THE INVENTORS

Aspects of this technology are described in an article Alrosan, A., Alomoush, W., Norwawi, N. et al. An improved artificial bee colony algorithm based on mean best-guided approach for continuous optimization problems and real brain MRI images segmentation. Neural Comput & Applic 33, 1671-1697 (2021). doi.org/10.1007/s00521-020-05118-9, and is herein incorporated by reference in its entirety.

BACKGROUND

Technical Field

The present disclosure is directed to a system and method for segmentation of brain MRI images, and in particular segmentation of brain MRI images using a clustering algorithm based on an artificial bee colony and fuzzy C-means.

Description of Related Art

Several challenges exist in solving optimization problems related to engineering applications, scientific domain applications, economic field applications, and social areas. As these application areas evolve in development, some issues related to solution of the optimization problems increase complexity, such as multimodal, strong constraints, large scale, nonlinear, discrete, and multi-objective problems. It is well known that solving these problems through traditional mathematical approaches is often inefficient. See Ghambari S, Rahati A (2018), An improved artificial bee colony algorithm and its application to reliability optimization problems, Appl Soft Comput 62:736-767; and Alomoush A A, et al., Modified opposition based learning to improve harmony search variants exploration, International conference of reliable information and communication technology. (2019) Springer, each incorporated herein by reference in their entirety.

Consequently, it is necessary to devise or improve more effective algorithms for solving optimization problems. Among these algorithms, several are inspired from intelligent behaviors of a swarm such as the particle swarm optimization (PSO), the ant colony optimization (ACO), the firefly (FA), the artificial bee colony (ABC), the cuckoo search (CS), and the bat algorithm (BA). See Kennedy J, Eberhart R (1995) Particle swarm optimization. In: Proceedings of the IEEE international conference on neural networks; Dorigo M, Di Caro G (1999) Ant colony optimization: a new meta-heuristic. In: Proceedings of the 1999 congress on evolutionary computation-CEC99 (Cat. No. 99TH8406). IEEE; Yang X-S (2010) Firefly algorithm, stochastic test functions and design optimisation. arXiv preprint arXiv:1003.1409; Alomoush W, et al (2018) Firefly photinus search algorithm. J King Saud Univ-Comput Inf Sci (In Press); Karaboga D, Basturk B (2007) A powerful and efficient algorithm for numerical function optimization: artificial bee colony (ABC) algorithm. J Glob Optim 39(3): 459-471; Yang X-S, Deb S (2010) Engineering optimisation by cuckoo search. arXiv preprint arXiv:1005.2908; Alomoush W (2019) Cuckoo search algorithm based dynamic parameter adjustment mechanism for solving global optimization problems. Int J Appl Eng Res 14(24):4434-4440; and Yang X-S (2010) A new metaheuristic bat-inspired algorithm. In: Nature inspired cooperative strategies for optimization (NICSO 2010). Springer, pp 65-74, each incorporated herein by reference in their entirety. These algorithms are naturally inspired by the social behaviors of bird flocking, ant colonies, bee colonies, etc.

The ABC algorithm is a comparatively new swarm intelligence algorithm proposed by Karaboga and Basturk. The effectiveness of the ABC algorithm was proven by comparing its performance against other popular algorithms such as the genetic algorithm (GA), the differential evolution (DE), the ACO, and the PSO on many numerical optimization problems. See Holland J H (1992) Adaptation in natural and artificial systems: an introductory analysis with applications to biology, control, and artificial intelligence. MIT Press, Cambridge; Storn R, Price K (1997) Differential evolution-a simple and efficient heuristic for global optimization over continuous spaces. J Glob Optim 11(4):341-359; Dorigo et al.; Kennedy et al.; Ghambari et al.; Karaboga D, Basturk B (2008) On the performance of artificial bee colony (ABC) algorithm. Appl Soft Comput 8(1):687-697; and Karaboga D et al (2014) A comprehensive survey: artificial bee colony (ABC) algorithm and applications. Artif Intell Rev 42(1): 21-57, each incorporated herein by reference in their entirety. In addition, the ABC algorithm has a simple structure, few control parameters, easy to implement, and comparable performance. Therefore, the ABC algorithm has been successfully used in several domains, e.g., benchmark function, image processing, clustering, many real-world applications, etc. See Cao Y et al (2018) An improved global best guided artificial bee colony algorithm for continuous optimization problems. Clust Comput 22(2):3011-3019; Peng H, Deng C, Wu Z (2019) Best neighbor-guided artificial bee colony algorithm for continuous optimization problems. Soft Comput 23(18):8723-8740; Ning J et al (2018) A food source-updating information-guided artificial bee colony algorithm. Neural Comput Appl 30(3):775-787; Akay B, Karaboga D (2015) A survey on the applications of artificial bee colony in signal, image, and video processing. SIViP 9(4):967-990; Alomoush W et al (2018) A survey: challenges of image segmentation based fuzzy C-means clustering algorithm. J Theor Appl Inf Technol 96(16):1; Alrosan A, et al (2014) Artificial bee colony based fuzzy clustering algorithms for MRI image segmentation. In: International conference on advances in computer science and electronics engineering—CSEE; Karaboga D, Ozturk C (2011) A novel clustering approach: artificial Bee Colony (ABC) algorithm. Appl Soft Comput 11(1):652-657; Alomoush W, Alrosan A (2018) Metaheuristic search-based fuzzy clustering algorithms. arXiv preprint arXiv: 1802.08729; Karaboga et al. (2014); Aldeeb B A et al (2019) A comprehensive review of uncapacitated university examination timetabling problem. Int J Appl Eng Res 14(24): 4524-4547; and Alauthman M, et al (2019) Machine learning for phishing detection and mitigation. In: Machine learning for computer and cyber security: principle, algorithms, and practices, p 26, each incorporated herein by reference in their entirety. However, the standard ABC algorithm shows slow convergence speed because of its poor exploitation ability. See Cao Y et al (2019) An improved global best guided artificial bee colony algorithm for continuous optimization problems. Clust Comput 22(2):3011-3019, incorporated herein by reference in its entirety. The convergence speed of the ABC depends on a good balance between exploration and exploitation which is very critical for the ABC algorithm performance. See Crepinsek M, Liu S-H, Mernik M (2013) Exploration and exploitation in evolutionary algorithms: a survey. ACM Comput Surv (CSUR) 45(3):35, incorporated herein by reference in its entirety. The exploration process is visiting a new area inside a search space, whereas the exploitation process is visiting those areas inside a search space within the neighborhood of previously visited points. See Crepinsek et al. In recent years, many global best information-based search mechanisms were introduced to enhance the exploitation process of the ABC algorithm. The basic ABC algorithm is an efficient optimization algorithm to optimize basic multimodal and multidimensional functions. But, the ABC algorithm is inefficient in high-dimensional functions, constrained problems, and complex functions because of the limitation of convergence speed. See Singh A, Deep K (2019) Exploration-exploitation balance in artificial bee colony algorithm: a critical analysis. Soft Comput 23(19): 9525-9536; and Badem H et al (2018) A new hybrid optimization method combining artificial bee colony and limited-memory BFGS algorithms for efficient numerical optimization. Appl Soft Comput 70:826-844, each incorporated herein by reference in their entirety.

Many efforts have been exerted to solve the ABC algorithm limitations such as the Gbest-guided ABC search strategy (GABC). See Zhu G, Kwong S (2010) Gbest-guided artificial bee colony algorithm for numerical function optimization. Appl Math Comput 217(7):3166-3173, incorporated herein by reference in its entirety. This strategy was inspired by the PSO algorithm to improve the exploitation using the global best solution information to guide the search process of candidate solutions. Furthermore, Gao proposed an enhanced ABC algorithm, called EABC, which uses more information-based search equations to improve the searchability and the exploitation process. See Gao W-F, Liu S-Y, Huang L-L (2014) Enhancing artificial bee colony algorithm using more information-based search equations. Inf Sci 270:112-133, incorporated herein by reference in its entirety. In addition, Cao proposed an improved Gbest-guided ABC algorithm for a set of benchmark optimization problems (IABC) to improve the capability of the GABC algorithm. See Cao (2018).

All the aforementioned works have balanced the search behavior of the original ABC algorithm to an extent. The effect of that balance is evident in the reported results regarding the performance of each variant. However, there is still room for improvement to enhance the search behavior of the ABC algorithm.

Accordingly, it is one object of the present disclosure to provide a method and system for a Gbest-guided ABC search strategy (namely MeanABC) algorithm. This method and system are based on the information on the mean of the previous best solutions to improve the exploitation process. The method and system are applied to segmentation of brain MRI images. The method and system produces quality solutions, especially when compared with other state of the art methods.

SUMMARY

An aspect is a method of 3-D image segmentation by processing circuitry, the method can include obtaining at least one 3-D Magnetic Resonance Image (MRI) image having a plurality of pixels; an employee phase including performing at least one search cycle comprising: generating a plurality of solutions in a neighborhood of an employed bee's current position, taking into account: (a) movement of the employed bee's current position toward a mean value of a positive direction of a global best location and a positive direction of its own best location, (b) movement of the employed bee's current location toward the mean value of the positive direction of its own best location and a negative direction of the global best location, and (c) a random number; calculating a fitness value for each of the plurality of solutions based on membership values and distances to cluster centers, wherein each of the membership values is determined based on a degree of membership of a pixel of the 3-D MRI image to a cluster, and the distances are distances between the pixel and the cluster centers; and evaluating the solutions based on the fitness value to determine an end of the search cycle; performing image segmentation of the 3-D MRI image based on the centers of the plurality of clusters; and displaying the segmented 3-D image.

An aspect is a system for 3-D image segmentation, the system can comprise processing circuitry configured to obtain at least one 3-D Magnetic Resonance Image (MRI) image having a plurality of pixels, perform, in an employee phase, at least one search cycle comprising: generating a plurality of solutions in a neighborhood of an employed bee's current position, taking into account (a) movement of the employed bee's current location toward a mean value of a positive direction of a global best location and a positive direction of its own best location, (b) movement of the employed bee's current location toward the mean value of the positive direction of its own best location and a negative direction of the global best location, and (c) a random number, calculating a fitness value for each of the plurality of solutions based on membership values and distances to cluster centers, wherein each of the membership values is determined based on a degree of membership of a pixel of the 3-D MRI image to a cluster, and the distances are distances between the pixel and the cluster centers; and evaluating the solution based on the fitness value to determine an end of the search cycle, perform image segmentation of the 3-D MRI image based on centers of the plurality of clusters; and a display device displaying the segmented 3-D image.

An aspect is a non-transitory computer readable storage medium storing processing instructions, which when performed by processing circuitry, performs 3-D image segmentation comprising steps of obtaining at least one 3-D Magnetic Resonance Image (MRI) image having a plurality of pixels; an employee phase including performing at least one search cycle can include generating a plurality of solutions in a neighborhood of an employed bee's current position, taking into account (a) movement of the employed bee's current location toward a mean value of a positive direction of a global best location and a positive direction of its own best location, (b) movement of the employed bee's current location toward the mean value of the positive direction of its own best location and a negative direction of the global best location, and (c) a random number; calculating a fitness value for each of the plurality of solutions based on membership values and distances to cluster centers, wherein each of the membership values is determined based on a degree of membership of a pixel of the 3-D MRI image to a cluster, and the distances are distances between the pixel and the cluster centers; and evaluating the solution based on the fitness value to determine an end of the search cycle; performing image segmentation of the 3-D MRI image based on centers of the plurality of clusters; and displaying the segmented 3-D image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 illustrates a pseudo-code of the ABC algorithm;

FIG. 3 is a block diagram of a computer system for performing an image segmentation method;

FIG. 5 illustrates a pseudo-code of the MeanABC algorithm;

FIG. 10 illustrates a pseudo-code of the MeanABC-FCM algorithm;

DETAILED DESCRIPTION

Figure 1:
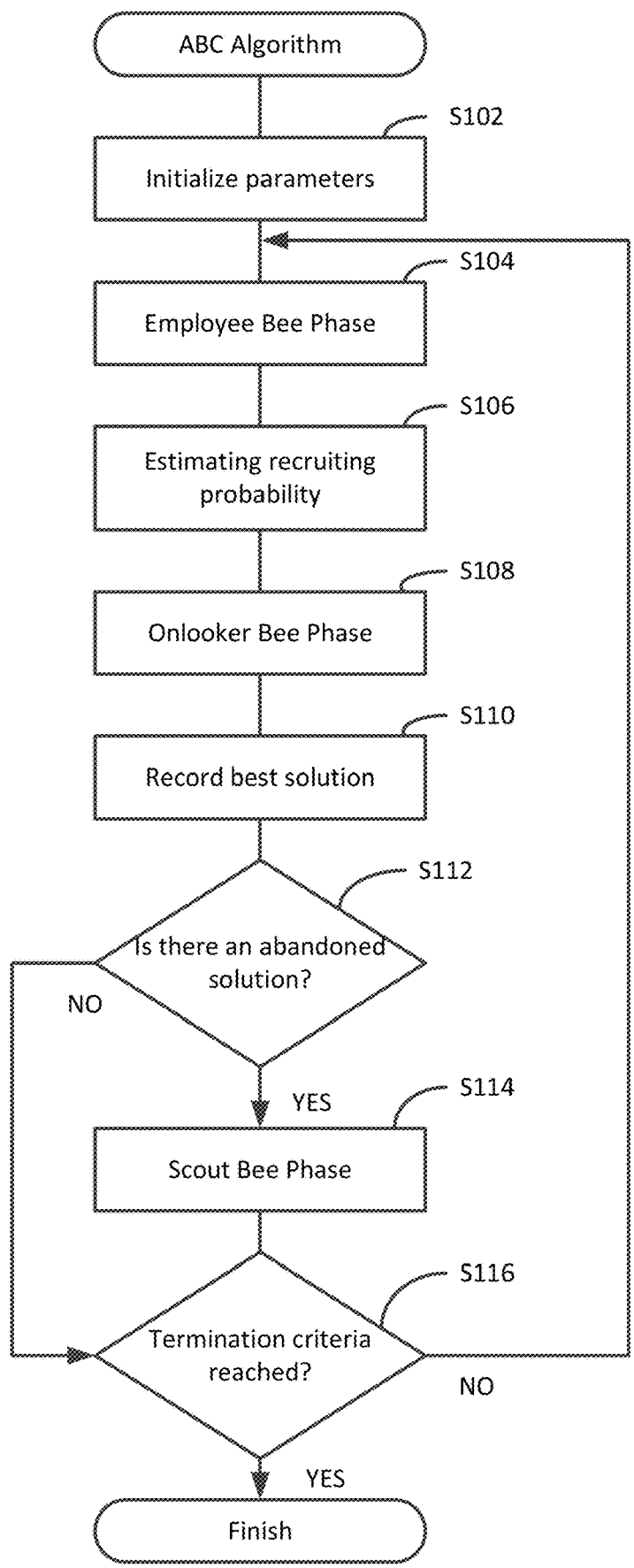
FIG. 1 is a flowchart of the ABC algorithm.

In the drawings, like reference numerals designate identical or corresponding parts throughout the several views. Further, as used herein, the words "a," "an" and the like generally carry a meaning of "one or more," unless stated otherwise.

Aspects of this disclosure are directed to a system, device, and method for performing image segmentation of 3-D brain Magnetic Resonance Imaging (MRI) images.

Problems that have been encountered in Magnetic Resonance (MR) segmentation of brain images generally include noise, very high nonuniformity in spatial intensity, and complexities related to variant shape. Most state-of-the-art segmentation methods have encountered difficulties in distinguishing and correctly classifying the cerebrospinal fluid (CSF) regions, Gray Matter (GM), and White Matter (WM) brain tissues.

The Original ABC Algorithm

The original ABC algorithm had been introduced by Karaboga and Basturk, and is inspired by bee swarm behavior. Fundamentally, the ABC algorithm includes three types of bees including scouts, employed, and onlookers. The employed bees take the initial part of the colony and the onlookers occupy the subsequent part of the colony. The food source volume is equivalent to the number of employed bees; after the food source has been deserted by the employed bees, they become scouts. One option for the optimization problem has been to specify a location of a food source.

Furthermore, regarding the food source, the amount of nectar refers to the excellent fitness of the corresponding solution depicted by the food source. Based on the process of probability-based selection, the onlookers are positioned on the food sources. The growth in the amount of nectar in the food source triggers the growth in the probability value of the food source desired by the onlookers.

FIG. 1 is a flowchart of the ABC algorithm. FIG. 2 illustrates a pseudo-code of the ABC algorithm.

Initialization Phase

In the initialization phase S102 (line 1 in FIG. 2), sources of food are randomly initialized as follows $$x_{i,j}=x_{min,j}+\text{rand}(0,1)(x_{max,j}-x_{min,j}) \quad (1)$$

where i=1, . . . , SN and SN is the number of food sources, j=1, 2, . . . , D, and D is the number of parameters, $x_{min,j}$ and $x_{max,j}$ are the lower and upper bounds values for the dimension j, respectively. Then, the obtained set of solutions is estimated, and their values of fitness function are computed. The nectar amount in the ABC algorithm becomes the value of the benchmark function.

Employed Bees Phase

In the Employed bees phase S104 (lines 5-13 in FIG. 2), each employed bee finds a new food source in the neighborhood of its current source $x_j$. The new food source is calculated as in Eq. 2.

$$v_{ij}=x_{ij}+\phi_{ij}(x_{ij}-x_{kj}), \quad (2)$$

where k∈[(1, 2, . . . SN) and j∈(1, 2, . . . D) are randomly chosen indexes and K≠i·$\phi_{ij}$ is a random number between [0, 1]. Later, the employed bee analyzes the new solution, as opposed to the existing solution, and the superior solution will be memorized through a greedy selection process. After generating the new candidate food source $v_{ij}$, its fitness is computed and a greedy selection process is used between $v_{ij}$ and $x_{ij}$. The fitness of a solution fit($x_i$) can be computed from its fitness function value $f(x_i)$ using Eq. 3.

$$\text{fit}(x_i) = \begin{cases} \frac{1}{(1+f(x_i))} & \text{if } f(x_i) \geq 0 \\ 1+abs(f(x_i)) & \text{if } f(x_i) < 0 \end{cases} \quad (3)$$

Onlooker Bees Phase

In the onlooker bees phase, in S106 (line 14 in FIG. 2), every onlooker bee selects a source of food with a probability that is related to the fitness value of a food source participated by employed bees. The value of probability is computed as in Eq. 4.

$$p^i = \frac{\text{fit}_i}{\sum_{n=1}^{sn} \text{fit}_i}, \qquad (4)$$

where a food source is chosen, as in the phase of employed bees In S108 (lines 15-24 in FIG. 2) a neighbor source $v_i$ is found as in Eq. 2, and its fitness value is calculated. Then, a greedy selection process is applied among $v_i$ and $x_i$. Thus, recruiting more bees as onlookers to best sources and nonnegative feedback behavior appears.

Scout Bees Phase

At the end of each search cycle S110, when solutions are not improving during many trials reaching a "limit," S112 (line 26 in FIG. 2), in S114, the employed bees become scout bees and their solutions are abandoned (lines 27, 28 in FIG. 2). Thus, (YES in S112) the scout bees begin a new search to find new solutions randomly as in Eq. 1. These phases are repeated until they reached a termination criterion (YES in S116). FIG. 3 is a block diagram of a computer system for performing an image segmentation method.

In one implementation, the functions and processes for 3-D MRI brain image segmentation may be implemented by a computer 326. Next, a hardware description of the computer 326 according to exemplary embodiments is described with reference to FIG. 3. In FIG. 3, the computer 326 includes a CPU 300 which performs, or controls processing of, the processes described herein. The process data and instructions may be stored in memory 302. These processes and instructions may also be stored on a storage medium disk 304 such as a hard drive (HDD) or portable storage medium or may be stored remotely. Further, the storage medium is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 326 communicates, such as a server or another computer.

Further, embodiments may be provided as a utility application, background daemon, or component of an operating system, or combination thereof, executing in conjunction with CPU 300 and an operating system such as Microsoft® Windows®, UNIX®, Oracle® Solaris, LINUX®, Apple macOS® and other systems.

In order to achieve the computer 326, the hardware elements may be realized by various circuitry elements, known to those skilled in the art. For example, CPU 300 may be a Xenon® or Core® processor from Intel Corporation of America or an Opteron® processor from AMD of America, or may be other processing circuitry. Alternatively, the CPU 300 may be implemented on an FPGA, ASIC, PLD or using discrete logic circuits. Further, CPU 300 may be implemented as multiple processing cores cooperatively working in parallel to perform the instructions of the processes described herein.

The computer 326 in FIG. 3 also may include a network controller 306, such as an Intel Ethernet PRO network interface card from Intel Corporation of America, for interfacing with network 324. As can be appreciated, the network 324 can be a public network, such as the Internet, or a private network such as LAN or WAN network, or any combination thereof and can also include PSTN or ISDN sub-networks. The network 324 can also be wired, such as an Ethernet network, or can be wireless such as a cellular network including EDGE, 3G, 4G, and 5G wireless cellular systems. The wireless network can also be WiFi®, Bluetooth®, or any other wireless form of wireless communication that is known.

The computer 326 may further include a display controller 308, such as a NVIDIA® GeForce® GTX or Quadro® graphics adaptor from NVIDIA Corporation of America for interfacing with display 310, such as a Hewlett Packard® HPL2445w LCD monitor. A general purpose I/O interface 312 interfaces with a keyboard and/or mouse 314 as well as an optional touch screen panel 316 on or separate from display 310. General purpose I/O interface also connects to a variety of peripherals 318 including printers and scanners, such as an OfficeJet® or DeskJet® from Hewlett Packard®.

The general purpose storage controller 320 connects the storage medium disk 304 with communication bus 322, which may be an ISA, EISA, VESA, PCI, or similar, for interconnecting all of the components of the computer 326. A description of the general features and functionality of the display 310, keyboard and/or mouse 314, as well as the display controller 308, storage controller 320, network controller 306, and general purpose I/O interface 312 is omitted herein for brevity as these features are known.

ABC Variants and Related Works

Recently, many researchers have made improvements to the ABC algorithm. Several ABC variants have been presented to handle benchmark and real-world problems. In the following, some of the ABC variants are described.

According to Zhu and Kwong, the ABC algorithm is still insufficient due to its standard search equation where the algorithm favors the exploration over the exploitation behavior. Thus, they proposed an enhanced ABC algorithm based on Gbest-guided ABC called (GABC) algorithm by elaborating the global best (gbest) solution information with the search process to enhance the exploitation. The experiments carried out over a set of benchmark optimization functions showed that the proposed algorithm GABC was better than the original ABC algorithm in most cases of the experiments.

Furthermore, a new modification of the ABC algorithm called the MABC algorithm was proposed by Akay and Karaboga to solve problems of real parameters. See Akay B, Karaboga D (2012) A modified artificial bee colony algorithm for real-parameter optimization. Inf Sci 192:120-142, incorporated herein by reference in its entirety. The authors presented MABC by introducing three new control parameters such as scaling factor (SF), modification rate (MR), and limit. The new control parameters improved the ABC algorithm convergence rate by the MR parameter, and the SF parameter has been used to change the magnitude when producing neighboring solutions. Meanwhile, the parameters of MR and SF were used to check the effectiveness of the ABC algorithm with real-parameters. Then, the performance of MABC was compared to other state-of-the-art optimization algorithms and showed encouraging outcomes on several benchmark functions.

Moreover, Gao presented a new search equation at the onlookers' phase to improve the searchability and produce candidate solutions for the ABC algorithm See Gao W-F, Liu S-Y, Huang L-L (2013) A novel artificial bee colony algorithm with Powell's method. Appl Soft Comput 13(9):3763-

3775, incorporated herein by reference in its entirety. Also, to enhance the exploitation process in the ABC algorithm, Powell's method was used. Gao introduced a new version of the ABC algorithm called (EABC) to enhance the ABC algorithm's performance; the EABC was used to improve the exploitation processes. See Gao (2014). They proposed two new search equations at the onlooker and the employed bees in the onlookers' phases to enhance the generation of candidate solutions, respectively. Experiments were carried out on a set of benchmark optimization problems, and the results proved that the new modification of EABC outperformed the original ABC algorithm in terms of the strengthens, solution quality, and convergence speed when compared to related algorithms.

Wang proposed a new multi-strategy ensemble called the MEABC algorithm. See Wang H et al (2014) Multi-strategy ensemble artificial bee colony algorithm. Inf Sci 279:587-603, incorporated herein by reference in its entirety. The MEABC employed distinct solution search methods that cohabit during the search phase and compete to generate offspring. Experiments were carried out on several benchmark optimization functions. The outcomes of the MEABC were significantly better than those from some well-established evolutionary algorithms.

Karaboga and Gorkemli proposed a quick ABC algorithm that is called qABC. See Karaboga D, Gorkemli B (2014) A quick artificial bee colony (qABC) algorithm and its performance on optimization problems. Appl Soft Comput 23:227-238, incorporated herein by reference in its entirety. It presented the behavior of onlooker bees more accurately and enhanced the effectiveness of the local search capability in the original ABC. The qABC algorithm was presented, and its performance was analyzed by the neighborhood radius on a group of benchmark optimization functions. Also, some analyses on the effect of the colony size n and parameter limit in qABC algorithm were conducted. Furthermore, the performance of qABC was compared with other related algorithms.

Zhang and Liu presented a new ABC algorithm which is called NABC. See Zhang S, Liu S (2015) A novel artificial bee colony algorithm for function optimization. Math Problems Eng 2015:1, incorporated herein by reference in its entirety. It improved the exploitation process by integrating the (gbest) solution information with the search equation at the onlookers' phase. Also, they improve the exploration process by using a search equation in the employed bees. The experiments carried out on a group of benchmark optimization functions proved its fast convergence and good performance, especially when comparing NABC to the PSO, differential evolution (DE), and ABC algorithm. Further, the NABC was used to solve a set of 5 standard knapsack problems that showed its powerfulness and effectiveness.

Peng proposed a new search strategy based on a best guid of the neighbor solution, named NABC-2019. It improved the exploitation process of the NABC during the search phases. Furthermore, the operator of the global neighbor search process has reduced the randomness by the search experiences for the scouts. The experiments and results have been conducted and recorded on a group of benchmark optimization functions. NABC-2019 attained better performance in contrast to other involved state-of-the-art algorithms. Also, Sharma, Kumar presented an improved Gbest-guided artificial bee colony (IGABC), which enhanced the diversification and intensification processes in a search space region. See Sharma S, Kumar S, Sharma K (2019) Improved Gbest artificial bee colony algorithm for the constraints optimization problems. Evol Intell 1:1-7, incorporated herein by reference in its entirety. The performance of IGABC was evaluated by benchmark functions, and it was compared with the other related works.

Zhong proposed a new ABC modification based on Gbest-guided mechanism, namely IGAL-ABC. See Zhong F, Li H, Zhong S (2016) A modified ABC algorithm based on improved-global-best-guided approach and adaptive-limit strategy for global optimization. Appl Soft Comput 46:469-486, incorporated herein by reference in its entirety. The authors introduced an adaptive limit strategy to handle global optimization problems. Also, two factors of nonlinear adjustment are carried out to improve the exploitation capability and speed of convergence. Experiments carried out on many benchmark functions showed that the IGAL-ABC is effective, especially when it is compared to other related works. In addition, Cao presented IABC to strengthen the performance of the GABC algorithm. See Cao (2018). The authors modified the search equation to enhance the exploitation process. Experiments were conducted on ten functions, and the obtained performance of IABC was better than some other ABC algorithm variants.

Embodiments of the MeanABC Approach

As mentioned before, the ABC algorithm has some challenges in terms of the balance between exploration and exploitation and the slow convergence speed when solving complex multimodal problems. In the disclosed embodiments, the current position of each bee is compared with the mean of the pbest and gbest positions to update the search equation in the MeanABC algorithm. In addition, the information regarding the best solutions is inspired by MPSO, which was employed to achieve a balance between exploration and exploitation processes. See Deep et al. The MeanABC algorithm is described in more detail as follows.

Mean Artificial Bee Colony Algorithm (MeanABC)

Figure 4:
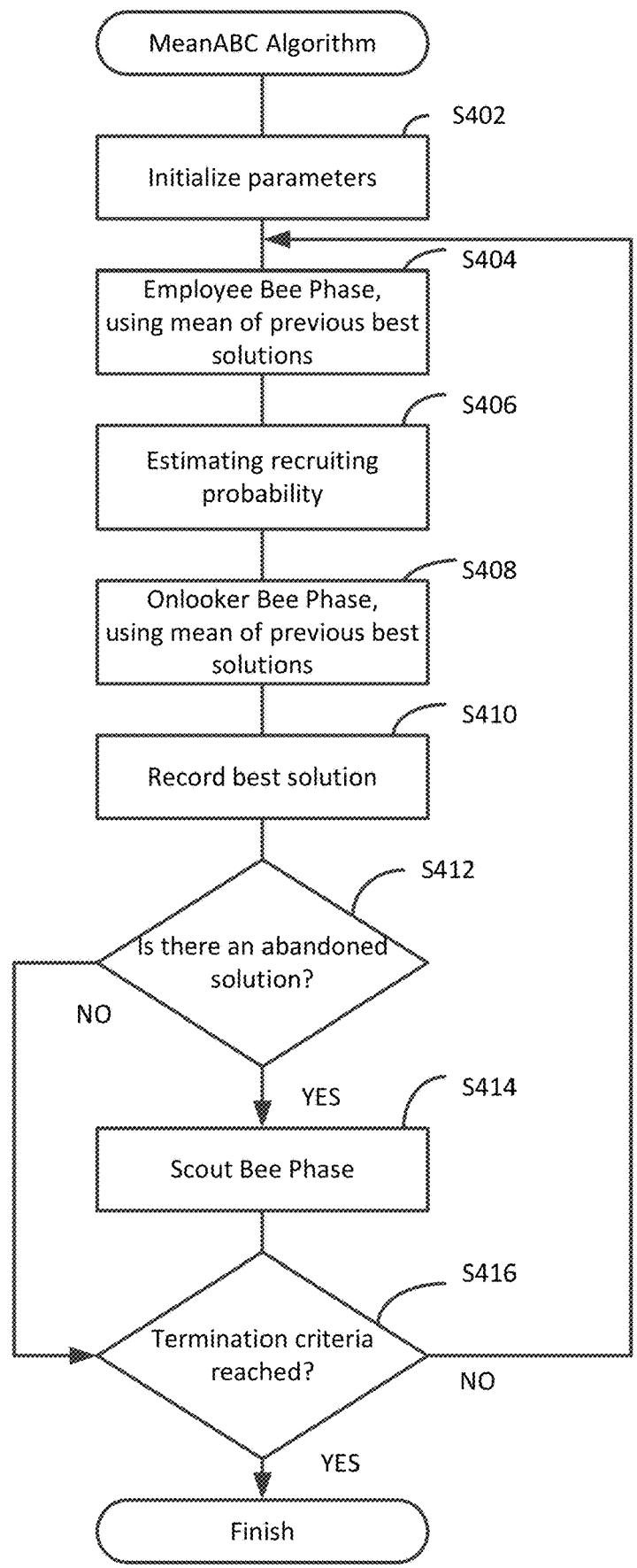
FIG. 4 is a flowchart of the MeanABC algorithm, in accordance with an exemplary aspect of the disclosure.

FIG. 4 is a flowchart of the MeanABC algorithm, in accordance with an exemplary aspect of the disclosure. FIG. 5 illustrates a pseudo-code of the MeanABC algorithm.

In S402 (line 1 in FIG. 5), the food sources are randomly initialized as in Eq. 1. The acquired solutions are evaluated and their fitness function values are computed. In S404 (lines 5-13 in FIG. 5), the employed bee of the MeanABC algorithm displays the employed bee behavior and returns a better solution (i.e., food source) at the neighborhood position of the food source $(x_{i,j})$ in their minds. Here, each employed bee can always remember its previous best position and generate a new position within its neighborhood in its memory.

The MeanABC algorithm provides a new updated search equation for the employed bee phase based on the information of the best solutions to generate a new food source in the neighborhood of $(x_{i,j})$ as follows $$v_{ij} = x_{ij} + \varphi_{ij}(x_{ij} - x_{kj}) + \Psi_{ij}\left[\left(\frac{pbest_i + gbest}{2} - x_{ij}\right) + \left(\frac{pbest_i - gbest}{2} - x_{ij}\right)\right], \quad (5)$$

where the first term $x_{i,j}$ represents the current location, the second term $\varphi_{ij}(x_{ij}-x_{kj})$ is the difference between the current location and the new location, and $\varphi_{ij}$ is a random number between $[-1,1]$. The first and second terms are similar to those of the standard ABC algorithm. The new updated search equation of MeanABC is the third term. A new term is added where the first part of the third term is responsible for the movement of bee's current location toward the mean value of the positive direction of the global best location (i.e., gbest) and positive direction of its own best location (i.e., pbest), $$\left(\frac{pbest_i + gbest}{2} - x_{ij}\right).$$

The second part of the third term is responsible for the movement of the bee's current location toward the mean value of the positive direction of its own best location (pbest) and the negative direction of the global best location (−gbest).

$$\left(\frac{pbest_i - gbest}{2} - x_{ij}\right).$$

$\psi$ represents a random number from [0, C], where C is a positive constant number. The positive constant C plays an important role in the balance between exploration and exploitation of the candidate food. See Zhu. When C=0, there is no difference between ABC and MeanABC in the search equation. Also, when C increases from zero to a suitable value, the balance between exploitation and exploitation of MeanABC will also improve correspondingly. However, C should not be very large because large values of C might result in a relatively weak exploration ability. In addition, when C is assigned to a large value, the gbest part drives the new candidate solution to move toward the global best solution, which will also weaken the exploitation process. After generating the new candidate solution $v_{ij}$, its fitness is computed and a greedy selection process is used between $v_{ij}$ and $x_{ij}$. The fitness of a solution fit($x_i$) can be computed from its fitness function $f(x_i)$ as in Eq. 3. Subsequently, the food source information will be shared by employed bees with onlooker bees that are waiting in the hive dancing in the dancing area.

In S406 (line 14 in FIG. 5), at the onlooker bees phase, each onlooker selects a food source with a probability that is related to the nectar amount (fitness) of a food source shared by employed bees. The probability is calculated as in Eq. 4. After a food source is selected, as in the employed bees phase, in S408 (lines 15-24 in FIG. 5) a neighbor source $v_i$ is determined using Eq. 5. Then, a greedy selection is applied between $v_i$ and $x_i$. Therefore, recruiting more onlookers to richer sources, positive feedback behavior appears. At the end of each search cycle S410, when solutions are not improving during many trials reaching a "limit," S412 (line 26 in FIG. 5), in S414, the employed bees become scout bees and their solutions are abandoned (lines 27, 28 in FIG. 5). Thus, (YES in S412) the scout bees begin a new search and produce new solutions, randomly using Eq. 1. These phases are repeated until they reach a termination criterion (YES in S416).

The Difference Between MeanABC and ABC Variants Based on Gbest-Guided

Recently, some of researchers have focused on studying the search equation. The majority of researchers had presented information of the best solutions inspired by PSO to improve the performance of ABC such as Gbest-guided ABC algorithms (GABC) and enhanced artificial bee colony (EABC). See Zhu and Gao (2014). Also, the MeanABC focused on enhancing the search equation based on the information about the best solutions inspired by MeanPSO to improve the performance of ABC. See Deep K, Bansal J C (2009) Mean particle swarm optimisation for function optimisation. Int J Comput Intell Stud 1(1):72-92, incorporated herein by reference in its entirety.

Figure 6A:
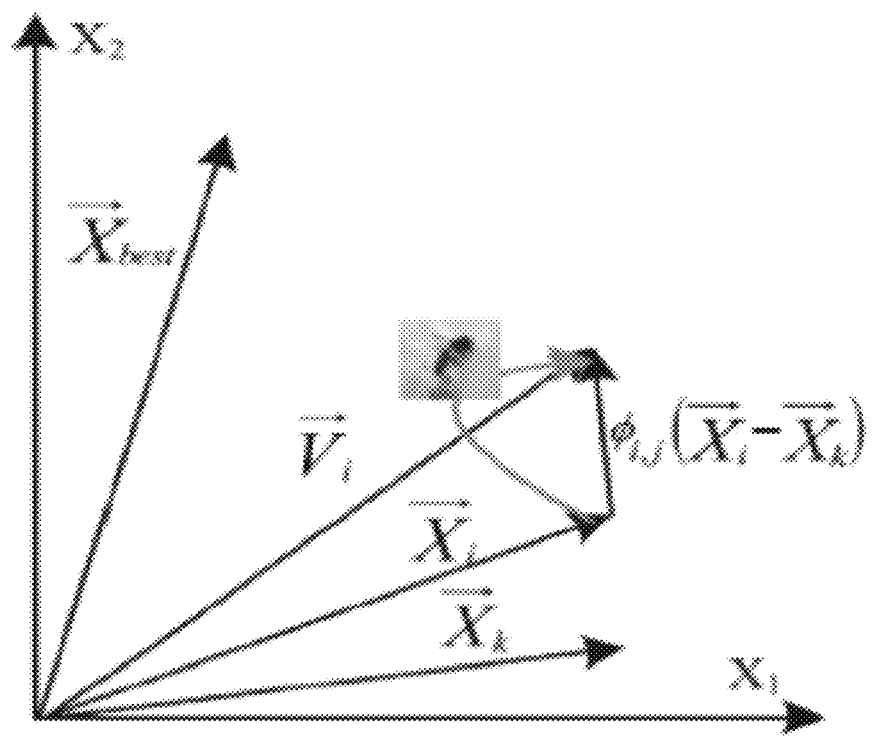
FIGS. 6A-6D illustrate the difference between (ABC, GABC, EABC, and MeanABC) movements.
Figure 6B:
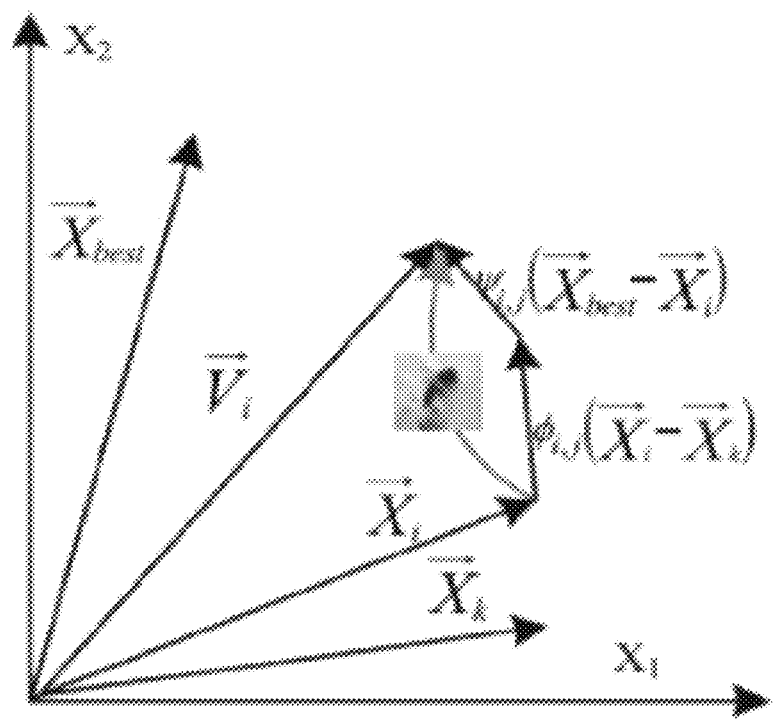
Figure 6C:
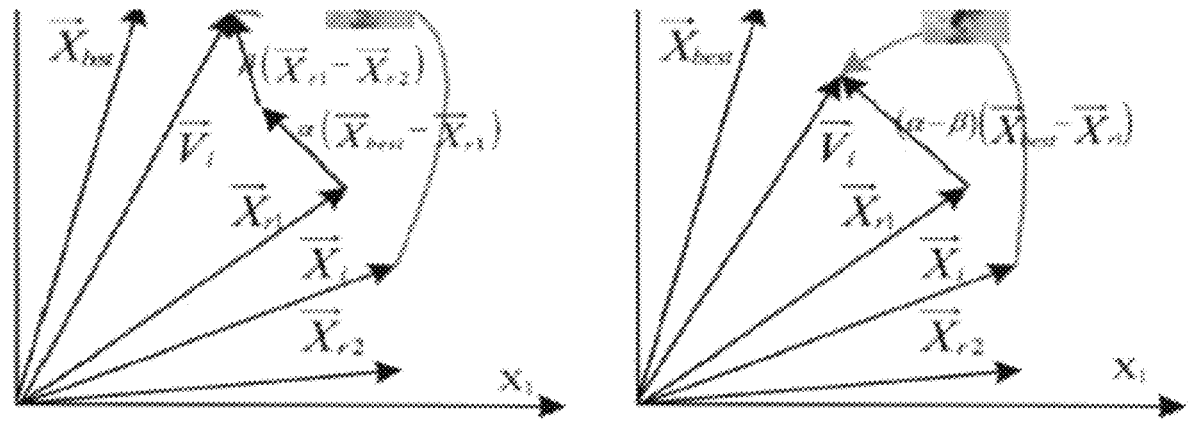
Figure 6D:
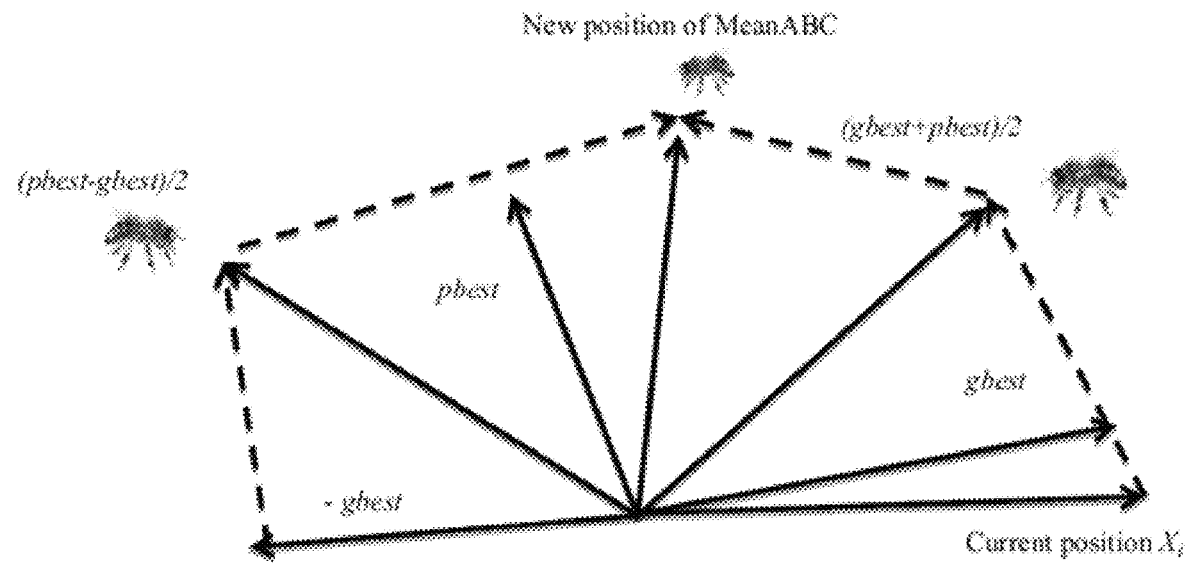
Figure 7A:
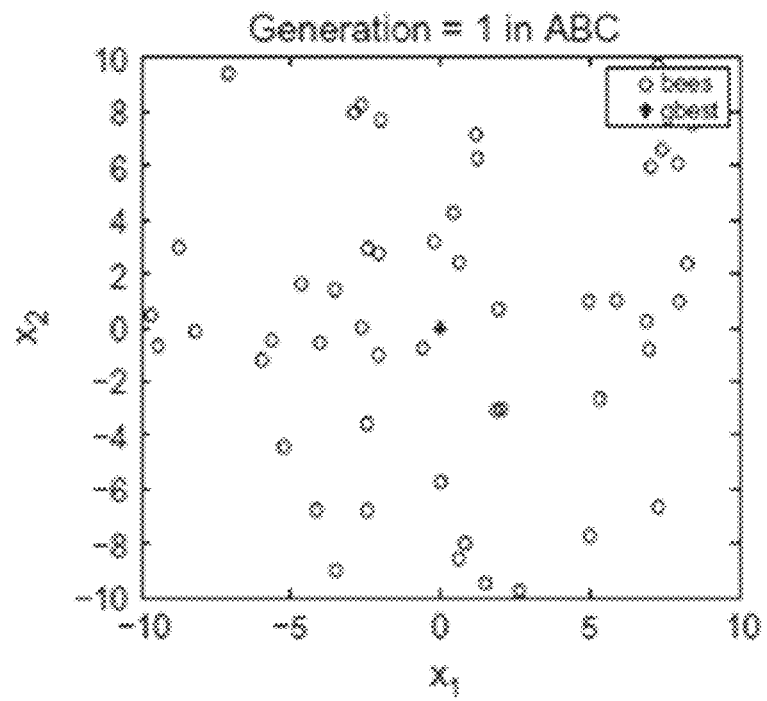
FIGS. 7A-7L illustrate the population distribution of the sphere function behavior at difference iterations in ABC, GABC, EABC, and MeanABC.
Figure 7B:
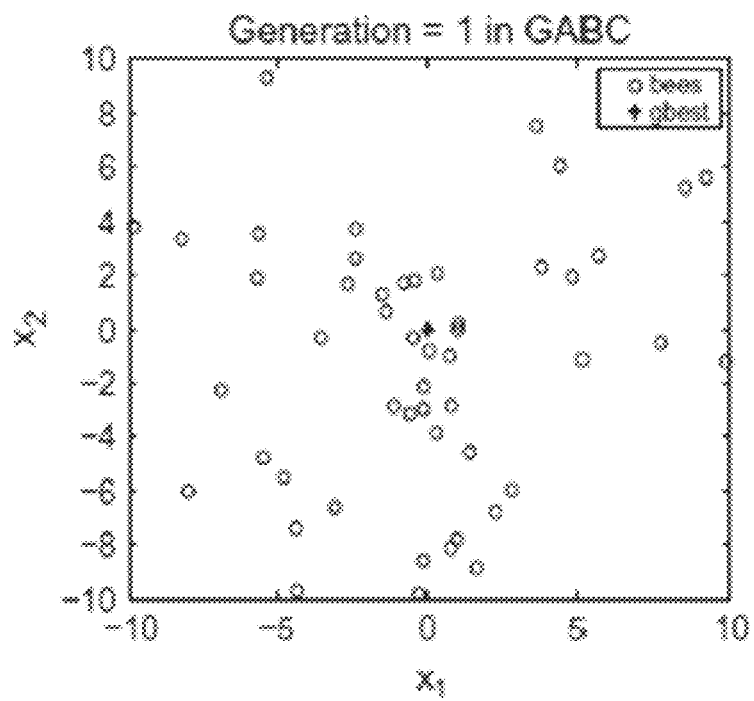
Figure 7C:
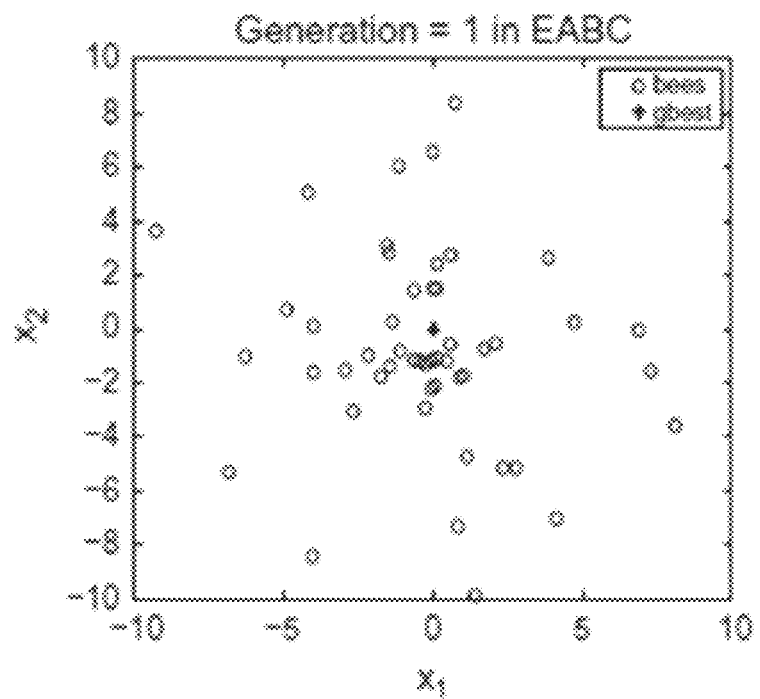
Figure 7D:
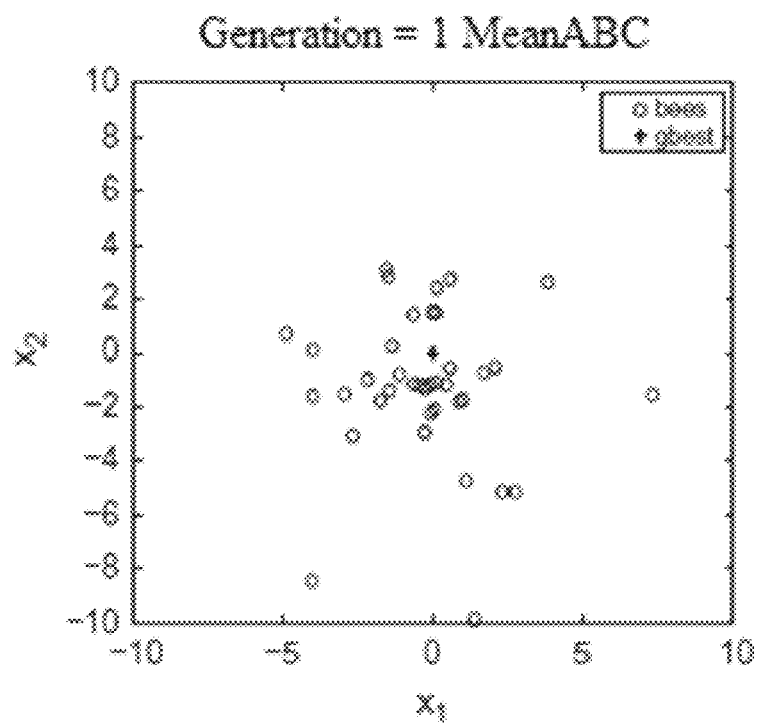
Figure 7E:
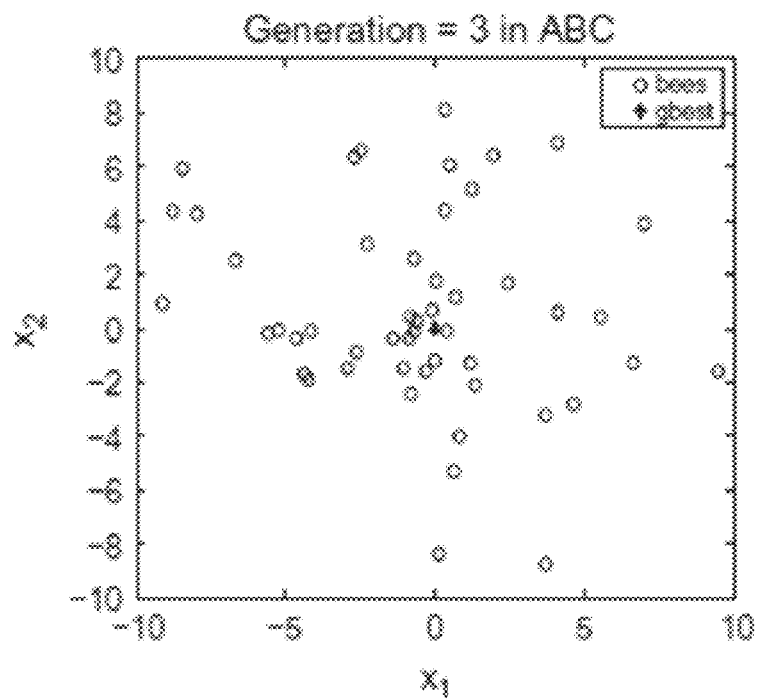
Figure 7F:
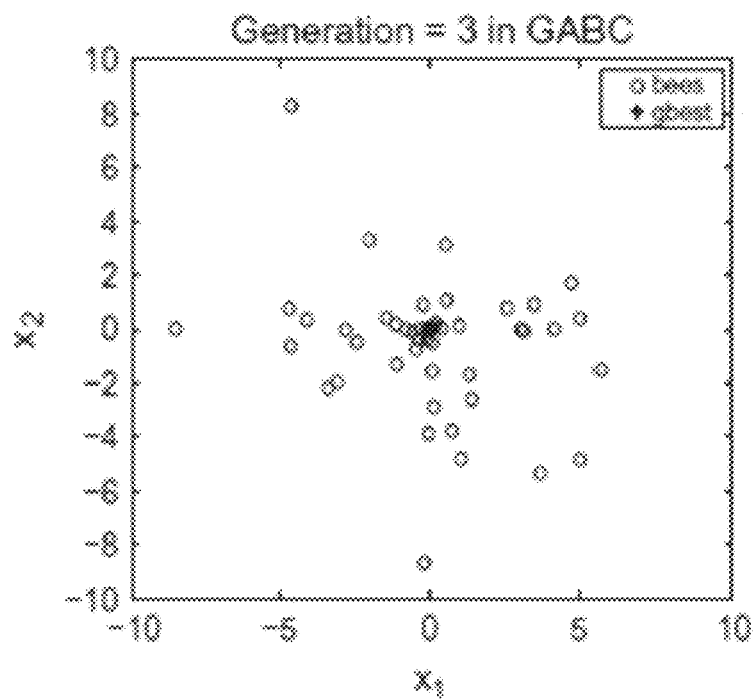
Figure 7G:
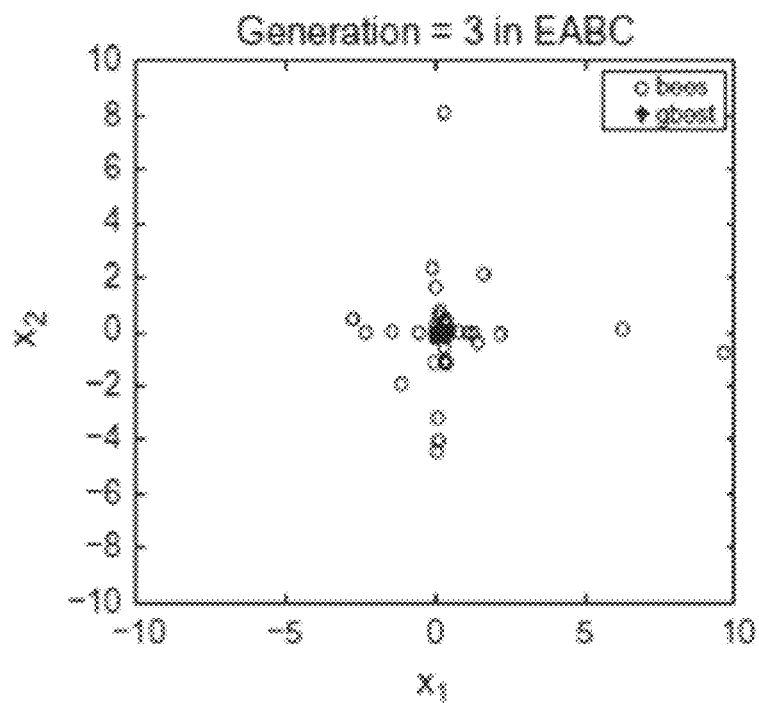
Figure 7H:
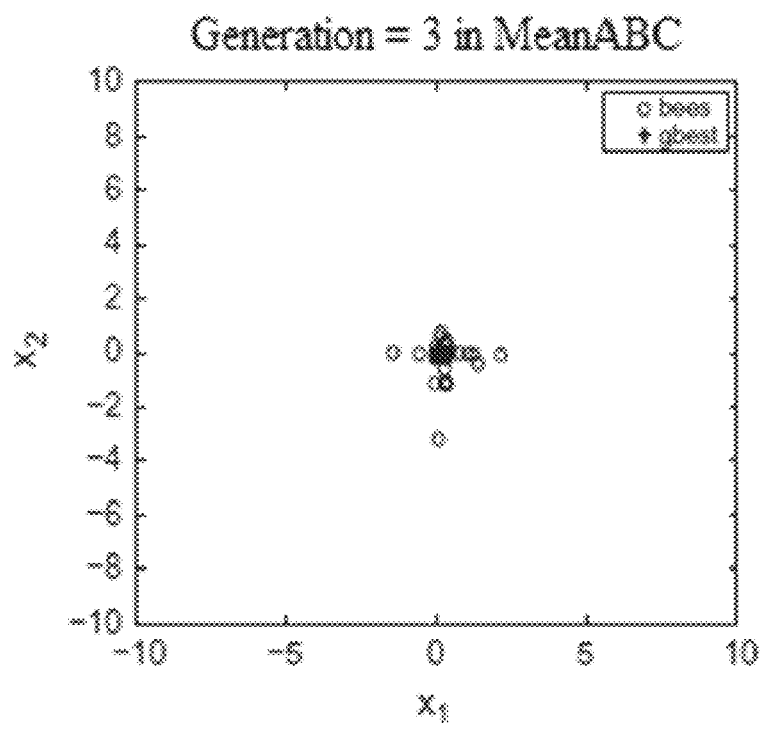
Figure 7I:
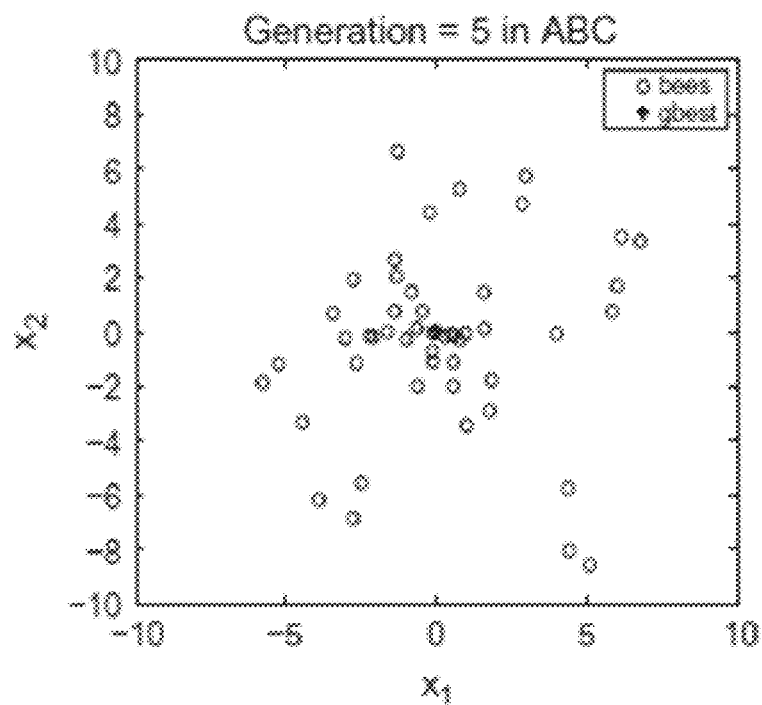
Figure 7J:
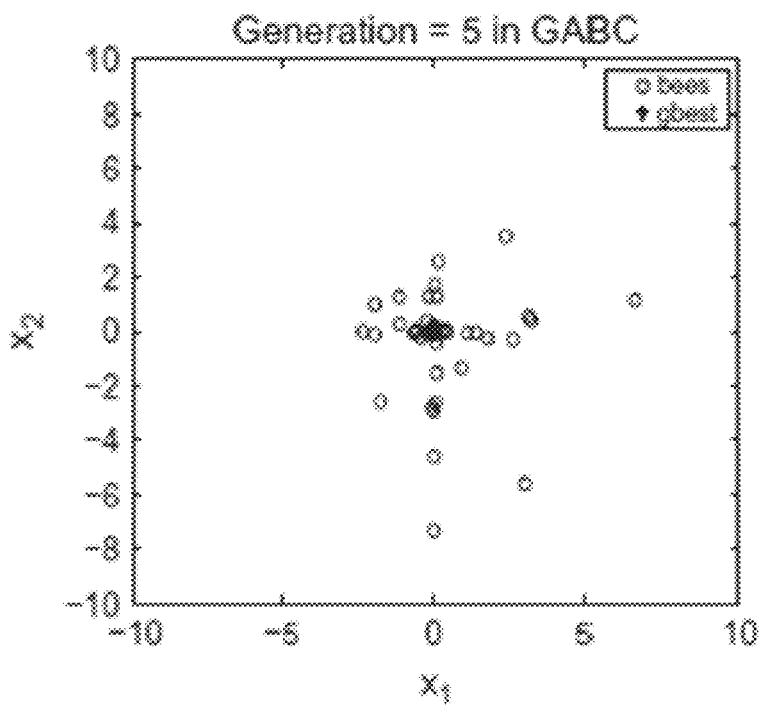
Figure 7K:
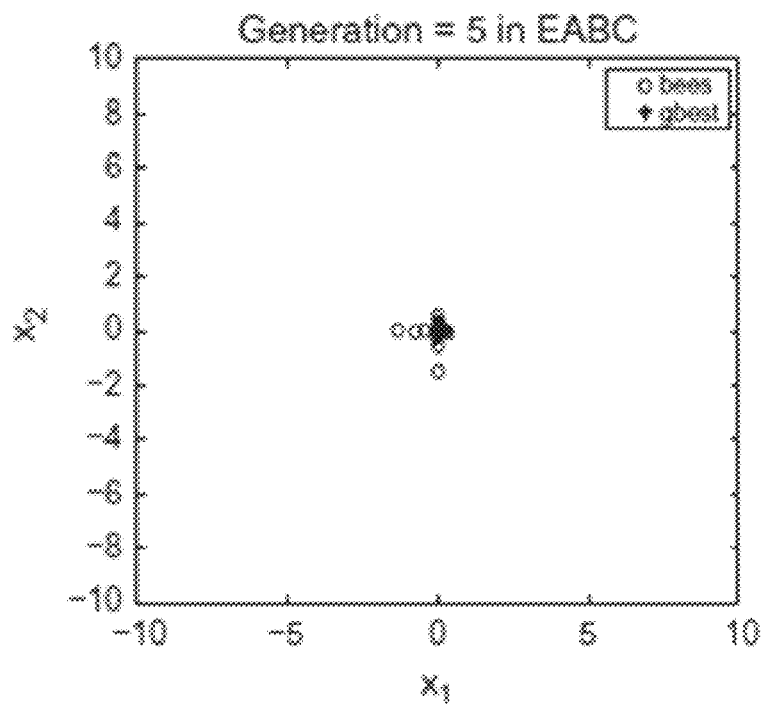
Figure 7L:
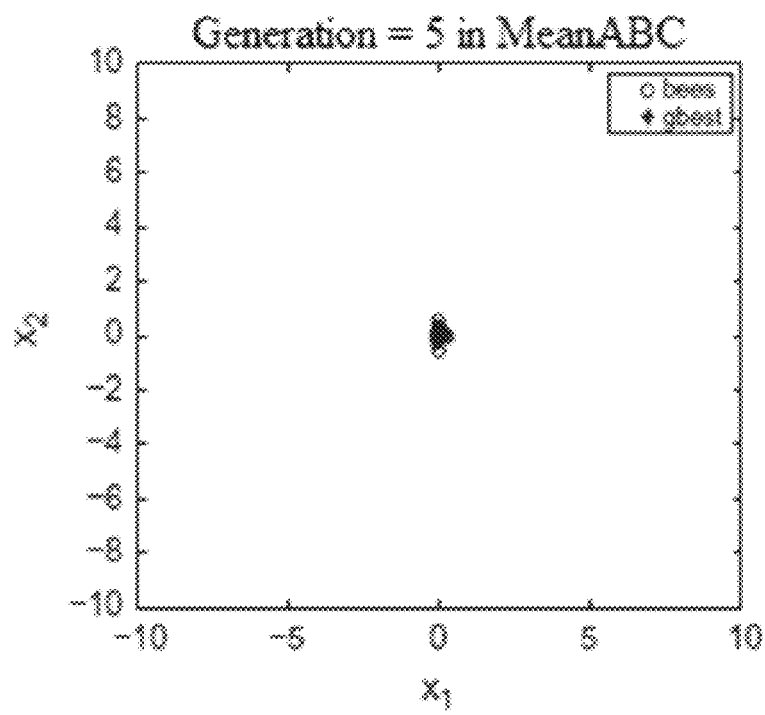
Figure 8A:
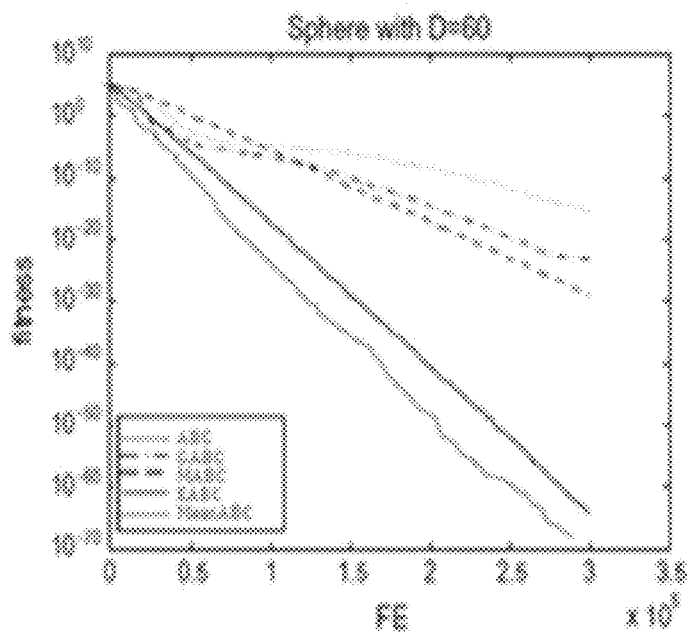
FIGS. 8A-8H illustrate the convergence rate performance of MeanABC and ABC variants on test benchmark functions.
Figure 8B:
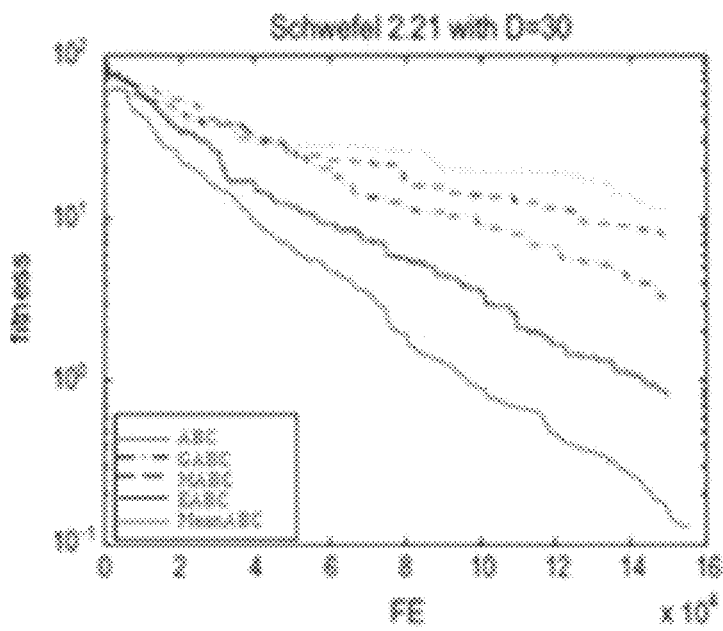
Figure 8C:
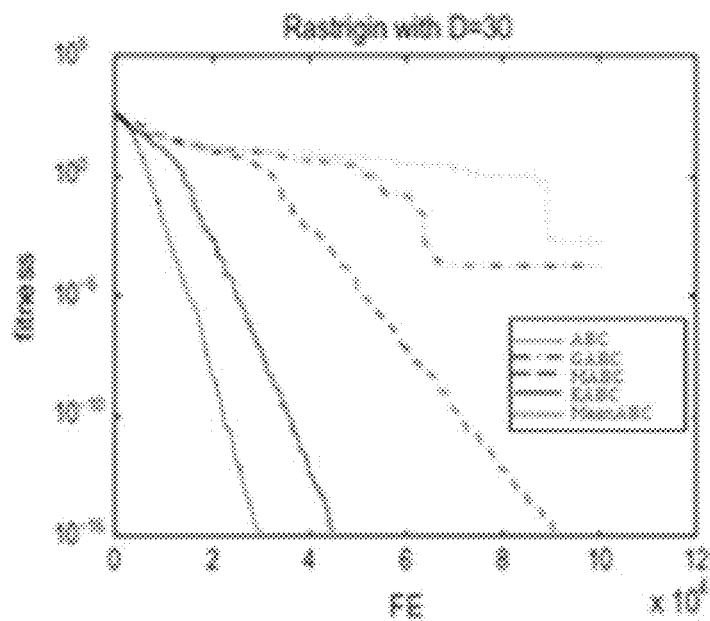
Figure 8D:
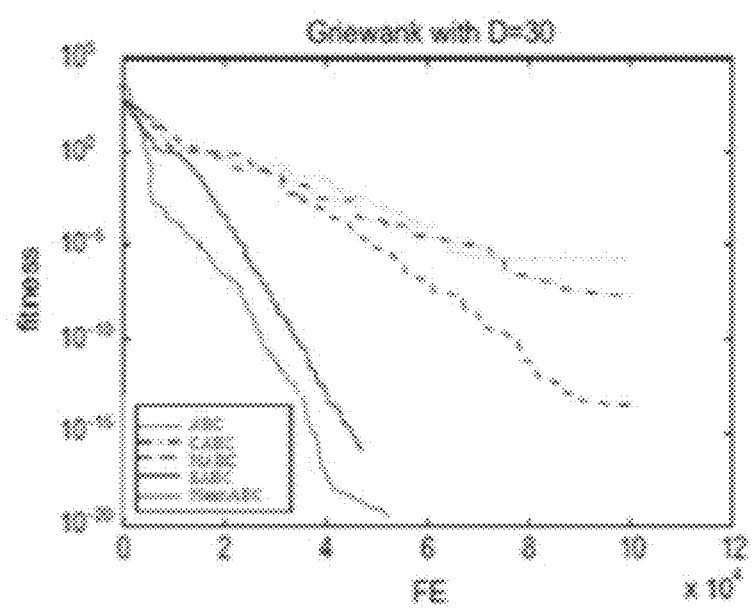
Figure 8E:
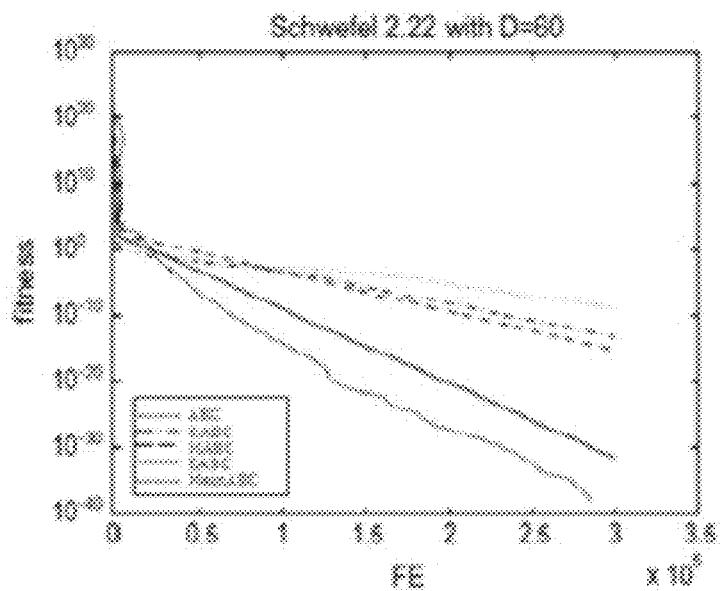
Figure 8F:
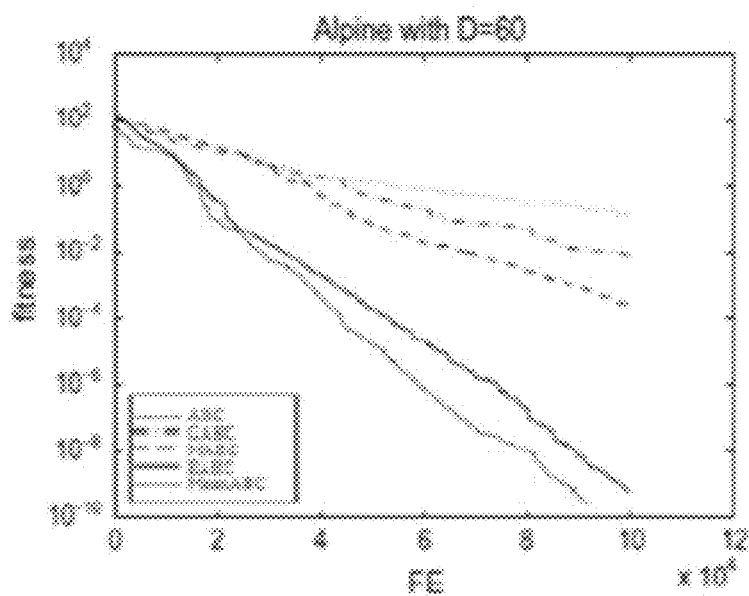
Figure 8G:
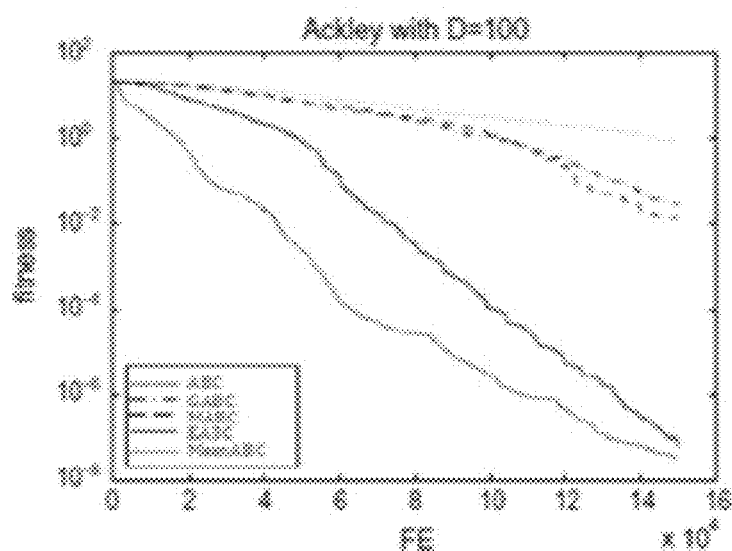
Figure 8H:
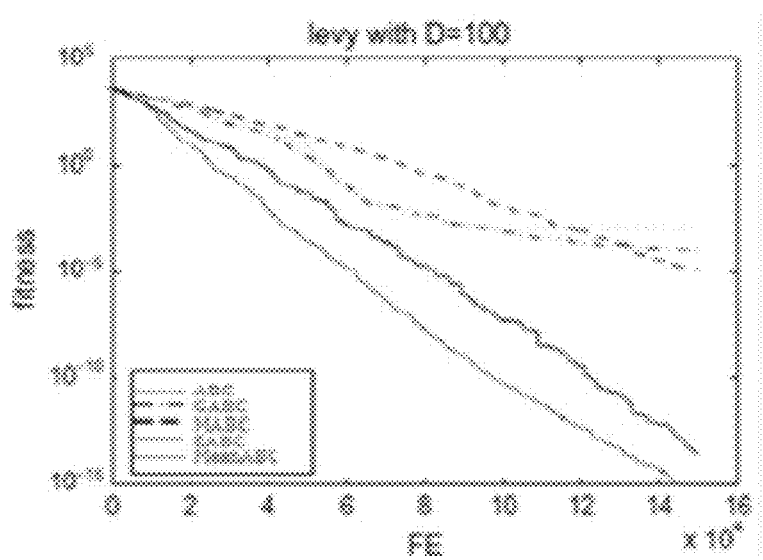

The main differences between MeanABC, ABC, GABC, and EABC are represented in FIGS. 6A to 6D and summarized in Table 1. Also, the population distribution behavior is investigated in the ABC, GABC, EABC, and MeanABC algorithms. The population distribution of the sphere function is shown in FIGS. 6A to 6D with different iterations of ABC, GABC, EABC, and MeanABC, respectively. FIG. 6A is a graph of movement of the ABC based search equation. FIG. 6B is a graph of movement of the GABC based search equation. FIG. 6C is a graph of movement of the EABC based employee and onlooker search equation. FIG. 6D is a graph of movement of the MeanABC based on search equation. FIGS. 7A-7L are plots of population distribution of the sphere function behavior at different iterations in ABC, GABC, EABC, and MeanABC. As clearly shown in FIGS. 7A-7L, MeanABC can converge faster to the global optima than ABC, GABC, and EABC. The MeanABC has more information to guide the bees to the global optimum solution by the combination of pbest and gbest. FIG. 7A is a plot of generation 1 for the ABC algorithm. FIG. 7B is a plot of generation 1 for the GABC algorithm. FIG. 7C is a plot of generation 1 for the EABC algorithm. FIG. 7D is a plot of generation 1 for the MeanABC algorithm. FIG. 7E is a plot of generation 3 for the ABC algorithm. FIG. 7F is a plot of generation 3 for the GABC algorithm. FIG. 7G is a plot of generation 3 for the EABC algorithm. FIG. 7H is a plot of generation 3 for the MeanABC algorithm. FIG. 7I is a plot of generation 5 for the ABC algorithm. FIG. 7J is a plot of generation 5 for the GABC algorithm. FIG. 7K is a plot of generation 5 for the EABC algorithm. FIG. 7L is a plot of generation 5 for the MeanABC algorithm.

TABLE 1

The Difference between ABC, GABC, EABC, and MeanABC

| ABC's algorithms | Descriptions | Search equation |
| --- | --- | --- |
| ABC | The solutions in ABC are generated by moving from the old position toward a new position selected randomly without information on previous best solutions (guided) | $vij = x_{ij} + \phi(x_{ij} - x_{kj})$ |
| GABC | Inspired by PSO to improve exploitation using the information of the global best solution to guide the search of candidate solations | $v_{ij} = x_{ij} + \varphi_{ij}(x_{ij} - x_{ij}) + \psi_i(y_j - x_{ij})$ |
| EABC | Inspired by PSO and adopted two different search equations to provide information about the movement direction and making it more suitable to move toward ths current best solution | Employe bees:<br>$v_{ij} = x_{r1,j} + \alpha(x_{best,j} - x_{r1,j}) + \beta(x$<br>Onlookers bee:<br>$v_{ij} = x_{r1,j} + \alpha(x_{best,j} - x_{r1,j}) + \beta(x_i$ |

TABLE 1-continued

The Difference between ABC, GABC, EABC, and MeanABC

| ABC's algorithms | Descriptions | Search equation |
|---|---|---|
| Proposed MeanABC | Inspired by MPSO. In MeanABC ths movement direction in the search equation used a linear combination of pbest and gbest in employed bee phase. The current position of each bee is compared with the mean combination $\left(\frac{pbest + gbest}{2} - x_{ij}\right)$ and $\left(\frac{pbest - gbest}{2} - x_{ij}\right)$ of pbest and $\pm$ gbest position (positive direction and negative direction) | $v_{ij} = x_{ij} + \varphi_{ij}(x_{ij} - x_{ij}) + \psi_{ij}$ $\left[\left(\frac{pbest_i + gbest}{2} - x_{ij}\right) + \left(\frac{pbest_i - gbest}{2} - x_{ij}\right)\right]$ |

Experimental Observations on Benchmark Functions

To evaluate the performance of the MeanABC algorithm, experiments have been tested on fourteen benchmark functions as in the majority of the recent works. See Peng, Zhu, Gao (2014), Akay, Gao (2013), Zhang, and Sharma. The test benchmark functions include: $f1$=sphere, $f2$=Schwefel2.22, $f3$=Schwefel2.21, $f4$=Quartic, $f5$=Rosenbrock, $f6$=Schwefel2.26, $f7$=Rastrigin, $f8$=NCRastrigin, $f9$=Griwank, $f10$=Ackley, $f11$=Penalized1, $f12$=Penalized2, $f13$=Alpine, $f14$=Levy, where $f1$-$f3$ are continuous unimodal functions, $f4$ is a noisy function, $f5$ is unimodal function, $f6$ is bound-constrained function, $f7$-$f14$ are multimodal, and the number of their local minima increases exponentially with the problem dimension. The dimensions for all functions are D=30, 60, and 100. See Gao (2014) and Zhang. More details about a set benchmark optimization functions are listed in Table 2.

TABLE 2

Test benchmark optimizaton functions

| Name | | Function | Search range | Accept |
|---|---|---|---|---|
| f1 | Sphere | $f1(x) = \sum_{i=1}^{n} x_i^2$ | $[-100, 100]^n$ | $1 \times 10^{-8}$ |
| f2 | Schwefel 2.22 | $f2(x) = \sum_{i=1}^{n} |x_i| + \prod_{i=1}^{n} |x_i|$ | $[-10, 10]^n$ | $1 \times 10^{-8}$ |
| f3 | Schwefel 2.21 | $f3(x) = \max\{|x_i|, 1 \leq i \leq n\}$ | $[-100, 100]$ | $1 \times 10^{0}$ |
| f4 | Quartic | $f4(x) = \sum_{i=1}^{n} ix_i^4 + \text{random}[0, 1)$ | $[1.28, 1.28]^n$ | $1 \times 10^{-2}$ |
| f5 | Rosenbrock | $f5(x) = \sum_{i=1}^{n-1}\left[100(x_{i+1} - x_i^2)^2 + (x_i - 1)^2\right]$ | $[-5, 10]^n$ | $1 \times 10^{-1}$ |
| f6 | Schwefel 2.26 | $f6(x) = 418.98288727243369 * n - \sum_{i=1}^{n} x_i$ | $[-500, 500]^n$ | $1 \times 10^{-8}$ |
| f7 | Rastrigin | $f7(x) = \sum_{i=1}^{n}\left[x_i^2 - 10\cos(2\pi x_i) + 10\right]$ | $[-5.12, 5.12]^n$ | $1 \times 10^{-8}$ |
| f8 | NCRastrigin | $f8(x) = \sum_{i=1}^{n}\left[y_i^2 - 10\cos(2\pi y_i) + 10\right]$ | $[-5.12, 5.12]^n$ | $1 \times 10^{-8}$ |
| f9 | Griwank | $f9(x) = \frac{1}{4000}\sum_{i=1}^{n} x_i^2 - \prod_{i=1}^{n}\cos\left(\frac{x_i}{\sqrt{i}}\right) + 1$ | $[-600, 600]^n$ | $1 \times 10^{-8}$ |
| f10 | Ackley | $f10(x) = -20\exp\left(-0.2\sqrt{\frac{1}{n}\sum_{i=1}^{n} x_i^2}\right) - \exp($ | $[-32, 32]^n$ | $1 \times 10^{-8}$ |
| f11 | Penalized1 | $f11(x) = \frac{\pi}{n}\left\{10\sin^2(\pi y_1) + \sum_{i=1}^{n-1}(y_i - 1)^2[1 + 10si + \right.$ $\sum_{i=1}^{n} u(x_i, 10, 100, 4)$ $y_i = 1 + \frac{1}{4}(x_i + 1)$ | $[-50, 50]^n$ | $1 \times 10^{-8}$ |

TABLE 2-continued

Test benchmark optimizaton functions

| Name | Function | Search range | Accept |
|---|---|---|---|
| | $u_{x_i,a,k,m} = \begin{cases} k(x_i - a)^m & x_i > a \\ 0 & a \le x_i \le a \\ k(-x_i - a)^m & x_i < -a \end{cases}$ | | |
| f12 Penalized2 | $f12(x) = \frac{1}{10}\left\{\sin^2(\pi x_1) + \sum_{i=1}^{n-1}(x_i - 1) + \sum_{i=1}^{n} u(x_i, 5 \pm, 100, 4)\right.$ | $[-50, 50]^n$ | $1 \times 10^{-8}$ |
| f13 Alpine | $f13(x) = \sum_{i=1}^{n}[x_i \cdot \sin(x_i) + 0.1 \cdot x_i]$ | $[-10, 10]^n$ | $1 \times 10^{-8}$ |
| f14 Levy | $f14(x) = \sum_{i=1}^{n-1}(x_i - 1)^2\left[1 + \sin^2\left[1 + \sin^2(3\pi x_{i+1})\right]\right]$ | $[-10, 10]^n$ | $1 \times 10^{-8}$ |

The parameter settings used for MeanABC follow the parameter settings as in GABC, MABC, EABC, and NABC. See Zhu, Gao (2014), Akay, Gao (2013), and Zhang. The maximum cycle number is MCN=500, 1000, 1500, 2000, 2500, 3000, and 5000, respectively. Also, the population size is 100, called, SN=50, and limit is L=200, which are the same as in Aldeeb and Badem, while the value of nonnegative constant parameter is C=1.5. The maximum number of evaluations (FE) is population size multiplied by the maximum cycle number (FE=SN*MCN) which was set to 50,000, 100,000, 150,000, 200,000, 250,000, 300,000, and 500,000 for all dimensions, 30, 60, and 100, respectively. All experiments were carried out by 30 independent runs for each benchmark.

In Table 3, MeanABC performance is compared with ABC. The findings are displayed in terms of the best, worst, mean, and standard deviation (SD) of the outcomes achieved by each algorithm over 30 different runs. Firstly, the MeanABC provides better accuracy on most functions except for function $f5$. Also, the MeanABC can find optimal solutions on functions $f6$-$f10$ which means the performance of the MeanABC is related to sufficient balance between the exploration and the exploitation. A nonparametric statistical analysis to decide whether the effects of the MeanABC algorithm are statistically significant from those of other algorithms called Wilcoxon's test for independent tests is performed where the degree of significance is set at 0.05. See Derrac J et al (2011) A practical tutorial on the use of nonparametric statistical tests as a methodology for comparing evolutionary and swarm intelligence algorithms. Swarm Evol Comput 1(1):3-18, incorporated herein by reference in its entirety. In Table 3, the levels of statistical significance between the MeanABC and ABC algorithms are listed. Furthermore, the data in Table 3 shows that MeanABC is superior in most functions.

Table 3 Best, worst, mean, and SD values obtained by ABC and MeanABC on $f1$ to $f14$

TABLE 3

Best, worst, mean, and SD values obtained by ABC as MeanABC on f1 to f14

| Function | Dim | Algorithm | Best | Worst | Mean | SD | Significant |
|---|---|---|---|---|---|---|---|
| F1 | 30 | ABC | 5.04e−16 | 7.25e−16 | 6.06e−16 | 9.34e−17 | |
| | | MeanABC | 2.84e−106 | 5.14e−103 | 6.2e−105 | 1.06e−104 | + |
| | 60 | ABC | 1.40e−15 | 1.87e−15 | 1.62e−15 | 2.02e−16 | |
| | | MeanABC | 6.48e−102 | 3.47e−100 | 4.02e−101 | 2.3e−101 | + |
| | 100 | ABC | 2.20e−15 | 9.32e−15 | 3.36e−15 | 2.01e−15 | |
| | | MeanABC | 1.76e−104 | 9.41e−102 | 3.9e−103 | 3.22e−106 | + |
| F2 | 30 | ABC | 2.38e−11 | 1.34e−10 | 7.05e−11 | 5.19e−11 | |
| | | MeanABC | 1.63e−29 | 8.23e−29 | 2.02e−29 | 1.10e−29 | + |
| | 60 | ABC | 9.02e−11 | 8.23e−10 | 4.08e−10 | 1.57e−10 | |
| | | MeanABC | 6.41e−29 | 3.71e−28 | 2.92e−28 | 1.54e−28 | + |
| | 100 | ABC | 2.05e−09 | 5.36e−08 | 3.67e−09 | 4.80e−09 | |
| | | MeanABC | 2.90e−28 | 8.42e−27 | 1.04e−27 | 6.88e−28 | + |
| F3 | 30 | ABC | 8.68e+00 | 1.20e+01 | 1.10e+01 | 1.29e−00 | |
| | | MeanABC | 2.74e−28 | 7.29e−28 | 5.08e−28 | 1.34e−29 | + |
| | 60 | ABC | 4.53e+01 | 5.08e+01 | 4.86e+01 | 1.90e−00 | |
| | | MeanABC | 3.49e−26 | 6.12e−25 | 7.22e−26 | 1.98e−56 | + |
| | 100 | ABC | 6.92e+01 | 7.43e+01 | 7.25e+01 | 1.86e−00 | |
| | | MeanABC | 1.16e−20 | 5.10e−19 | 2.07e−20 | 3.16e−21 | + |
| F4 | 30 | ABC | 6.57e−02 | 1.66e−01 | 1.17e−01 | 2.57e−02 | |
| | | MeanABC | 2.27e−23 | 4.68e−22 | 4.58e−23 | 1.09-22 | + |
| | 60 | ABC | 2.62e−01 | 5.15e−01 | 4.08e−01 | 6.52e−02 | |
| | | MeanABC | 9.45e−22 | 6.11e−20 | 6.86e−21 | 2.16e−21 | + |

TABLE 3-continued

Best, worst, mean, and SD values obtained by ABC as MeanABC on f1 to f14

| Function | Dim | Algorithm | Best | Worst | Mean | SD | Significant |
|---|---|---|---|---|---|---|---|
| | 100 | ABC | 7.21e−01 | 9.78e−01 | 8.64e−01 | 8.18e−02 | |
| | | MeanABC | 1.02e−19 | 4.70e−20 | 3.79e−19 | 2.53e−20 | + |
| F5 | 30 | ABC | 8.12e−03 | 1.68e−01 | 4.86e−02 | 4.84e−02 | |
| | | MeanABC | 3.19e−3 | 1.56e−1 | 5.99e−02 | 5.64e−02 | ≈ |
| | 60 | ABC | 1.08e−02 | 5.88e−01 | 1.41e−01 | 1.65e−01 | |
| | | MeanABC | 2.26e−02 | 2.74e−1 | 1.02e−01 | 9.95e−02 | ≈ |
| | 100 | ABC | 3.57e−02 | 9.94e−01 | 2.97e−01 | 3.64e−01 | |
| | | MeanABC | 1.21e−02 | 3.55e−01 | 3.50e−01 | 3.28e−01 | ≈ |
| F6 | 30 | ABC | 1.54e−06 | 2.37e+02 | 8.86e+01 | 8.62e+01 | |
| | | MeanABC | 0 | 0 | 0 | 0 | + |
| | 60 | ABC | 3.55e+02 | 7.60e+02 | 5.40e−02 | 1.41e+02 | |
| | | MeanABC | 4.01e−19 | 4.60e−17 | 3.08e−18 | 3.25e−19 | + |
| | 100 | ABC | 7.81e+02 | 1.55e+03 | 1.29e+03 | 2.23e+02 | |
| | | MeanABC | 1.13e−19 | 7.52e−19 | 2.48e−19 | 1.6e−17 | + |
| F7 | 30 | ABC | 5.36e−15 | 1.46e−01 | 9.58e−04 | 1.05e−03 | |
| | | MeanABC | 0 | 0 | 0 | 0 | + |
| | 60 | ABC | 5.87e−12 | 1.99e−00 | 2.68e−02 | 6.32e−02 | |
| | | MeanABC | 0 | 0 | 0 | 0 | + |
| | 100 | ABC | 8.65e−13 | 1.99e−00 | 2.97e−02 | 2.16e−01 | |
| | | MeanABC | 0 | 0 | 0 | 0 | + |
| F8 | 30 | ABC | 1.36e−13 | 6.21e−03 | 1.36e−03 | 1.03e−03 | |
| | | MeanABC | 0 | 0 | 0 | 0 | + |
| | 60 | ABC | 4.25e−09 | 1.00e−00 | 2.01e−02 | 1.68e−02 | |
| | | MeanABC | 0 | 0 | 0 | 0 | + |
| | 100 | ABC | 5.36e−08 | 2.01e−00 | 1.75e−01 | 4.20e−01 | |
| | | MeanABC | 0 | 0 | 0 | 0 | + |
| F9 | 30 | ABC | 8.01e−15 | 1.30e−12 | 2.37e−13 | 4.18e−13 | |
| | | MeanABC | 0 | 0 | 0 | 0 | + |
| | 60 | ABC | 8.32e−14 | 1.34e−11 | 3.45e−12 | 2.89e−12 | |
| | | MeanABC | 0 | 0 | 0 | 0 | + |
| | 100 | ABC | 5.36e−14 | 1.58e−09 | 1.80e−10 | 2.03e−10 | |
| | | MeanABC | 0 | 0 | 0 | 0 | + |
| F10 | 30 | ABC | 5.36e−10 | 1.23e−08 | 1.45e−09 | 2.37e−09 | |
| | | MeanABC | 2.30e−17 | 8.42e−17 | 6.07e−17 | 3.73e−17 | + |
| | 60 | ABC | 8.14e−09 | 7.54e−08 | 4.70e−08 | 2.04e−08 | |
| | | MeanABC | 6.48e−17 | 2.66e−15 | 3.36e−16 | 1.89e−15 | + |
| | 100 | ABC | 5.35e−08 | 4.28e−07 | 2.83e−07 | 1.57e−07 | |
| | | MeanABC | 1.32e−15 | 2.56e−14 | 5.26e−15 | 4.01e−15 | + |
| F11 | 30 | ABC | 1.37e−17 | 8.42e−16 | 3.94e−16 | 2.75e−16 | |
| | | MeanABC | 1.12e−34 | 3.52e−33 | 3.16e−34 | 2.11e−34 | + |
| | 60 | ABC | 3.68e−17 | 9.74e−16 | 6.81e−16 | 4.50e−16 | |
| | | MeanABC | 5.35e−34 | 6.82e−33 | 5.62e−33 | 2.48e−33 | + |
| | 100 | ABC | 5.73e−16 | 2.87e−15 | 8.79e−16 | 6.47e−16 | |
| | | MeanABC | 5.22e−32 | 8.16e−31 | 7.42e−31 | 0 | + |
| F12 | 30 | ABC | 1.71e−15 | 2.94e−14 | 5.83e−15 | 3.67e−15 | |
| | | MeanABC | 5.41e−34 | 4.63e−33 | 2.13e−33 | 0 | + |
| | 60 | ABC | 8.97e−15 | 6.43e−14 | 2.15e−14 | 1.92e−14 | |
| | | MeanABC | 3.15e−33 | 4.71e−32 | 4.65e−32 | 0 | + |
| | 100 | ABC | 7.56e−15 | 8.04e−14 | 5.19e−14 | 3.83e−14 | |
| | | MeanABC | 6.21e−34 | 1.24e−32 | 1.19e−33 | 0 | + |
| F13 | 30 | ABC | 1.79e−06 | 1.16e−05 | 4.37e−06 | 3.72e−06 | |
| | | MeanABC | 1.23e−27 | 4.86e−27 | 4.6e−27 | 3.47e−24 | + |
| | 60 | ABC | 9.93e−06 | 3.91e−05 | 2.14e−05 | 1.08e−05 | |
| | | MeanABC | 5.73e−26 | 4.82e−25 | 4.08e−25 | 2.16e−25 | + |
| | 100 | ABC | 1.21e−04 | 2.03e−03 | 1.12e−03 | 7.54e−04 | |
| | | MeanABC | 1.57e−22 | 6.47e−22 | 2.58e−22 | 3.12e−24 | + |
| F14 | 30 | ABC | 4.22e−15 | 4.13e−14 | 2.33e−14 | 1.49e−14 | |
| | | MeanABC | 2.68e−33 | 4.21e−32 | 1.89e−32 | 0 | + |
| | 60 | ABC | 2.02e−15 | 2.96e−13 | 6.30e−14 | 1.16e−13 | |
| | | MeanABC | 3.69e−33 | 7.64e−32 | 5.07e−32 | 0 | + |
| | 100 | ABC | 4.08e−15 | 2.13e−13 | 8.63e−14 | 7.91e−14 | |
| | | MeanABC | 1.43e−38 | 6.41e−38 | 2.29e−38 | 0 | + |

In Table 4, the MeanABC is further compared with gbest-guided algorithms as follows. Firstly, the experiments were conducted on ($f1$-$f5$) functions by the Mean-ABC algorithm. The outcomes obtained by the MeanABC were compared to other algorithms' outcomes reported in the GABC, MABC, EABC, and NABC works. See Zhu, Gao (2014), Akay, and Zhang. Table 4 presents the mean and standard deviation of the best results obtained by the MeanABC and the ABC variants on ($f1$-$f5$) functions with different dimensions, maximum cycle number, and the maximum number of evaluations. The parameter settings were (D=30, MCN=1500 FE=150,000), (D=60, MCN=3000, FE=300,000), and (D=100, MCN=5000, FE=500,000), respectively. See Zhu, Gao (2014), Akay, and Zhang. In Tables (3, 4, 5, 6, 7), it can be clearly seen that MeanABC generated the best results (mean) over all the ABC variants (GABC, MABC, EABC, and NABC) for all different dimensions and the maximum number of evaluations. Here, "Mean" represents the mean best functions value, and "SD" indicates the standard deviation.

TABLE 4

Comparison of ABC, GABC, MABC, EABC, and MeanABC On Benchmark Functions

|  | Dim = 30 Max · FE = 150,000 | | Dim = 60 Max · FE = 300,000 | | Dim = 100 Max · FE = 500,000 | |
| --- | --- | --- | --- | --- | --- | --- |
| f1 Sphere | Mean | SD | Mean | SD | Mean | SD |
| GABC | 1.37e−25 | 2.70e−25 | 4.86e−23 | 5.14e−23 | 9.05e−22 | 4.28e−22 |
| MABC | 9.43e−32 | 6.67e−32 | 6.03e−29 | 4.31e−29 | 1.43e−27 | 8.12e−28 |
| EABC | 4.42e−67 | 2.71e−67 | 2.30e−64 | 1.03e−64 | 6.37e−63 | 2.55e−63 |
| NABC | 1.10e−54 | 1.17e−54 | 1.48e−52 | 1.37e−52 | 1.45e−51 | 8.91e−52 |
| MeanABC | 6.2e−105 | 1.06e−104 | 4.02e−101 | 2.3e−101 | 3.9e−103 | 3.22e−106 |

|  | Dim = 30 Max · FE = 150,000 | | Dim = 60 Max · FE = 300,000 | | Dim = 100 Max · FE = 500,000 | |
| --- | --- | --- | --- | --- | --- | --- |
| f2 Schwefel 2.22 | Mean | SD | Mean | SD | Mean | SD |
| GABC | 5.56e−15 | 9.79e−15 | 5.61e−14 | 9.93e−15 | 2.29e−13 | 3.97e−13 |
| MABC | 2.40e−17 | 9.02e−18 | 6.69e−16 | 1.20e−16 | 4.41e−15 | 1.50e−15 |
| EABC | 5.51e−35 | 7.02e−35 | 5.08e−33 | 1.95e−34 | 4.68e−32 | 1.42e−32 |
| NABC | 2.02e−29 | 1.10e−29 | 2,92e−28 | 1.54e−28 | 1.04e−27 | 6.88e−28 |
| MeanABC | 5.08e−53 | 2.6e−52 | 4.03e−50 | 1.47e−51 | 3.79e−50 | 2.16e−53 |

|  | Dim = 30 Max · FE = 150,000 | | Dim = 60 Max · FE = 300,000 | | Dim = 100 Max · FE = 500,000 | |
| --- | --- | --- | --- | --- | --- | --- |
| f3 Schwelel 2.21 | Mean | SD | Mean | SD | Mean | SD |
| GABC | 3.07e+00 | 4.72e−01 | 3.85e+01 | 3.42e+00 | 7.04e+01 | 1.20e+00 |
| MABC | 1.02e+01 | 1.49e+00 | 3.77e+01 | 3.14e+00 | 5.98e+01 | 1.60e+00 |
| EABC | 6.46e−01 | 1.03e−01 | 2.49e+01 | 2.04e+00 | 6.19e+01 | 1.24e+00 |
| NABC | 2.67e−01 | 3.55e−02 | 2.71e−00 | 3.14e−01 | 9.92e+00 | 7.04e−01 |
| MeanABC | 5.08e−28 | 1.34e−29 | 7.22e−26 | 1.98e−56 | 2.07e−20 | 3.16e−21 |

|  | Dim = 30 Max · FE = 150,000 | | Dim = 60 Max · FE = 300,000 | | Dim = 100 Max · FE = 500,000 | |
| --- | --- | --- | --- | --- | --- | --- |
| f4 Quartic | Mean | SD | Mean | SD | Mean | SD |
| GABC | 4.72e−02 | 1.32e−02 | 2.27e−01 | 2.89e−02 | 4.96e−01 | 2.63e−01 |
| MABC | 3.71e−02 | 8.53e−03 | 1.14e−01 | 1.16e−02 | 2.31e−01 | 2.79e−02 |
| EABC | 1.38e−02 | 2.92e−03 | 5.94e−02 | 1.24e−03 | 1.72e−01 | 2.32e−02 |
| MeanABC | 4.58e−23 | 1.09e−22 | 6.86e−21 | 2.16e−21 | 3.79e−19 | 2.53e−20 |

|  | Dim = 30 Max · FE = 150,000 | | Dim = 60 Max · FE = 300,000 | | Dim = 100 Max · FE = 500,000 | |
| --- | --- | --- | --- | --- | --- | --- |
| f5 Rosebork | Mean | SD | Mean | SD | Mean | SD |
| GABC | 1.30e+00 | 1.64e+00 | 1.66e+01 | 3.28e+01 | 2.39e+01 | 3.34e+01 |
| MABC | 6.11e−01 | 4.55e−01 | 1.51e+00 | 1.34e+00 | 1.98e+00 | 1.30e+00 |
| EABC | 8.67e−02 | 7.48e−02 | 2.03e−01 | 1.32e−01 | 5.03e−01 | 8.82e−01 |
| NABC | 5.99e−02 | 5.64e−02 | 1.02e−01 | 9.95e−02 | 3.50e−01 | 3.28e−01 |
| MeanABC | 0 | 0 | 0 | 0 | 0 | 0 |

|  | D = 30 Max · FE = 50,000 | | D = 60 Max · FE = 100,000 | | D = 100 Max · FE = 200,000 | |
| --- | --- | --- | --- | --- | --- | --- |
| f6 Schwefel 2.26 | Mean | SD | Mean | SD | Mean | SD |
| GABC | 6.48e+00 | 2.38e+01 | 3.30e+01 | 4.94e+01 | 6.05e+01 | 8.05e+01 |
| MABC | 1.03e−15 | 2.21e−15 | 5.90e−04 | 4.93e−04 | 1.58e−05 | 2.30e−05 |
| EABC | 0 | 0 | 3.92e−11 | 3.56e−12 | 1.12e−10 | 3.56e−12 |
| NABC | 1.71e−09 | 3.01e−10 | 1.24e−09 | 5.02e−09 | 1.22e−10 | 2.97e−11 |
| MeanABC | 0 | 0 | 3.08e−18 | 3.25e−18 | 2.48e−19 | 1.6e−17 |

|  | D = 30 Max · FE = 100,000 | | D = 60 Max · FE = 150,000 | | D = 100 Max · FE = 250,000 | |
| --- | --- | --- | --- | --- | --- | --- |
| f7 Rastrigin | Mean | SD | Mean | SD | Mean | SD |
| GABC | 6.38e+00 | 2.38e+01 | 3.30e+01 | 6.32e−02 | 6.38e+00 | 2.38e+01 |
| MABC | 1.03e−15 | 2.21e−15 | 5.90e−04 | 49.4e+01 | 1.03e−15 | 2.213−15 |
| EABC | 0 | 0 | 0 | 4.93e−04 | 0 | 0 |
| NABC | 0 | 0 | 0 | 0 | 0 | 0 |
| MeanABC | 0 | 0 | 0 | 0 | 0 | 0 |

|  | D = 30 Max · FE = 100,000 | | D = 60 Max · FE = 150,000 | | D = 100 Max · FE = 250,000 | |
| --- | --- | --- | --- | --- | --- | --- |
| f8 NCRRastrigin | Mean | SD | Mean | SD | Mean | SD |
| GABC | 4.00e−01 | 4.90e−01 | 7.09e+00 | 1.40e+00 | 1.48e+01 | 1.95e+00 |
| MABC | 0 | 0 | 3.06e−09 | 2.64e−09 | 3.65e−08 | 5.68e−08 |
| EABC | 0 | 0 | 0 | 0 | 0 | 0 |

TABLE 4-continued

Comparison of ABC, GABC, MABC, EABC, and MeanABC On Benchmark Functions

| | | | | | | |
|---|---|---|---|---|---|---|
| MeanABC | 0 | 0 | 0 | 0 | 0 | 0 |
| MeanABC | 5.08e−53 | 2.6e−52 | 4.03e−50 | 1.47e−51 | 3.79e−50 | 2.16e−53 |

| | D = 30 Max · FE = 100,000 | | D = 60 Max · FE = 150,000 | | D = 100 Max · FE = 250,000 | |
|---|---|---|---|---|---|---|
| f9 Griewank | Mean | SD | Mean | SD | Mean | SD |
| GABC | 1.40e−08 | 1.16e−08 | 1.58e−06 | 1.00e−06 | 2.44e−06 | 2.50e−06 |
| MABC | 2.98e−14 | 5.88e−14 | 1.21e−10 | 1.40e−10 | 1.77e−10 | 7.36e−11 |
| EABC | 0 | 0 | 0 | 0 | 0 | 0 |
| NABC | 0 | 0 | 0 | 0 | 0 | 0 |
| MeanABC | 0 | 0 | 0 | 0 | 0 | 0 |

| | D = 30 Max · FE = 50,000 | | D = 60 Max · FE = 100,000 | | D = 100 Max · FE = 150,000 | |
|---|---|---|---|---|---|---|
| f10 Ackley | Mean | SD | Mean | SD | Mean | SD |
| GABC | 6.45e−03 | 2.68e−03 | 2.96e−03 | 2.14e−03 | 6.01e−02 | 9.60e−02 |
| MABC | 4.50e−04 | 8.87e−05 | 1.37e−03 | 3.88e−04 | 1.07e−02 | 3.51e−03 |
| EABC | 3.39e−10 | 6.95e−11 | 1.81e−09 | 2.70e−10 | 4.53e−08 | 1.12e−08 |
| NABC | 2.04e−08 | 4.72e−09 | 4.45e−08 | 1.50e−08 | 6.01e−07 | 3.23e−07 |
| MeanABC | 6.07e−17 | 3.73e−17 | 3.36e−16 | 1.89e−15 | 5.26e−15 | 4.01e−15 |

| | D = 30 Max · FE = 50,000 | | D = 60 Max · FE = 100,000 | | D = 100 Max · FE = 150,000 | |
|---|---|---|---|---|---|---|
| f11 Penalized 1 | Mean | SD | Mean | SD | Mean | SD |
| GABC | 3.96e−06 | 2.41e−06 | 1.34e−05 | 1.06e−05 | 2.51e−05 | 1.99e−05 |
| MABC | 3.02e−09 | 3.01e−09 | 2.56e−08 | 1.02e−08 | 1.16e−06 | 3.00e−07 |
| EABC | 6.46e−21 | 4.92e−21 | 8.10e−20 | 4.55e−20 | 4.34e−17 | 2.71e−17 |
| MeanABC | 3.16e−34 | 2.07e−38 | 5.62e−33 | 1.15e−39 | 7.42e−31 | 3.27e−35 |

| | D = 30 Max · FE = 50,000 | | D = 60 Max · FE = 100,000 | | D = 100 Max · FE = 150,000 | |
|---|---|---|---|---|---|---|
| f12 Penalized 2 | Mean | SD | Mean | SD | Mean | SD |
| GABC | 4.37e−05 | 3.79e−05 | 5.05e−05 | 5.50e−05 | 1.55e−04 | 9.21e−05 |
| MABC | 1.09e−07 | 3.73e−08 | 1.48e−06 | 3.27e−07 | 1.13e−04 | 6.16e−05 |
| EABC | 3.35e−20 | 1.01e−20 | 5.40e−18 | 4.16e−18 | 3.65e−15 | 6.62e−15 |
| MeanABC | 2.13e−33 | 3.94e−36 | 4.65e−32 | 6.19e−34 | 1.19e−31 | 4.47e−33 |

| | D = 30 Max · FE = 50,000 | | D = 60 Max · FE = 100,000 | | D = 100 Max · FE = 150,000 | |
|---|---|---|---|---|---|---|
| f13 alpine | Mean | SD | Mean | SD | Mean | SD |
| GABC | 1.31e−02 | 1.15e−02 | 5.86e−02 | 3.75e−02 | 1.31e−02 | 1.15e−02 |
| MABC | 7.91e−05 | 3.90e−05 | 4.04e−04 | 8.63e−05 | 7.91e−05 | 3.90e−05 |
| EABC | 6.45e−11 | 3.17e−11 | 5.43e−10 | 4.83e−10 | 6.45e−11 | 3.17e−11 |
| MeanABC | 4.6e−27 | 3.47e−24 | 4.08e−25 | 2.16e−25 | 4.6e−27 | 3.47e−24 |

| | D = 30 Max · FE = 50,000 | | D = 60 Max · FE = 100,000 | | D = 100 Max · FE = 150,000 | |
|---|---|---|---|---|---|---|
| f14 Levy | Mean | SD | Mean | SD | Mean | SD |
| ABC | 6.09e−03 | 3.02e−3 | 3.39e−03 | 3.89e−05 | 6.09e−03 | 3.02e−3 |
| GABC | 5.04e−05 | 2.39e−05 | 6.60e−05 | 1.09e−07 | 5.04e−05 | 2.39e−05 |
| MABC | 2.52e−08 | 1.48e−08 | 2.66e−07 | 9.28e−18 | 2.52e−08 | 1.48e−08 |
| EABC | 3.88e−18 | 3.07e−18 | 8.98e−18 | 4.67e−31 | 3.88e−18 | 3.07e−18 |
| MeanABC | 1.89e−32 | 1.19e−30 | 5.07e−32 | 3.89e−05 | 1.89e−32 | 1.19e−30 |

However, the MeanABC results for (f1-f5) are closer to the optimum solutions than GABC, MABC, EABC, and NABC, especially in the Rosebork function (f5). The MeanABC can prevent bees from being stuck in local minima because the mean is equal to 0. This means that the MeanABC algorithm has improved the bees' searching ability and enhanced the balance between exploration and exploitation. Also, it can be concluded from these results that the MeanABC algorithm is less sensitive to the dimensionality increase from all other ABC variants of the (f1-f5).

Secondly, Schwefel 2.26 (f6) is a bound-constrained function. Table 4 summarizes the computational outcomes obtained by the MeanABC and all ABC variants (GABC, MABC, EABC, and NABC) with different dimensions, maximum cycle number, and maximum number of evaluations (D=30, MCN=500, FE=50,000), (D=60, MCN=1000, FE=100,000), and (D=100, MCN=2000, FE=200,000), respectively. See Gao (2014) and Zhang. Data in Table 4 shows that the MeanABC outperforms all other ABC variants on f6 for all metrics. Only EABC and MeanABC have found the global optima of f6 where D=30. Compared to all ABC variants, the MeanABC achieves promising results and is less sensitive to the dimensionality increase when applied to f6. This is imputed to the improvement of bees' searchability.

Thirdly, the Rastrigin, NCRRastrigin, and Griewank functions (f7-f9) are multimodal. Table 4 summarizes the computational outcomes obtained by the MeanABC on (f7-f9)

functions and all ABC variants (GABC, MABC, EABC and NABC) with different dimensions, maximum cycle number, and maximum number of evaluations (D=30, MCN=1000, FE=100,000), (D=60, MCN=1500, FE=150,000), and (D=100, MCN=2500, FE=250,000), respectively. It is obvious that the MeanABC outperformed the other ABC variants (GABC and MABC) on Rastrigin $f7$ and Griewank $f9$ for all cases. Furthermore, the EABC, NABC, and MeanABC have found the global optimum of $f7$ where D=30, 60, and 100. Also, the MeanABC performed better than the GABC in all cases of NCRRastrigin $f8$ and outperformed the MABC where D=60 and D=100. The attained results by both MeanABC and EABC (for all cases) and MABC (where D=30) confirm that achieving the balance between exploration and exploitation has led to improve the searchability and consequently avoid being stuck in a local optimum solution. It is also noticeable that the MeanABC and EABC achieved promising results and they are less sensitive to the dimensionality curse compared to all other ABC variants on $f7$, $f8$, and $f9$.

Fourthly, the experiment results were obtained by the MeanABC on Ackley ($f10$). Table 4 presents the mean and standard deviation of the best results obtained by the MeanABC and the ABC variants on $f10$ with different dimensions, maximum cycle number, and the maximum number of evaluations, where (D=30, MCN=500, FE=50,000), (D=60, MCN=1000, FE=100,000), and (D=100, MCN=1500, FE=150,000), respectively. See Gao (2014) and Zhang. In Table 4, the MeanABC achieved the best results (mean) overall ABC variants for all different dimensions and the maximum number of evaluation cases. Also, the attained results by the MeanABC on $f10$ were more close to the optimum solution than other ABC variants, and less sensitive to the dimensionality increase.

Finally, the Penalized 1, Penalized 2, Alpine, and Levy functions ($f11$-$f14$) are multimodal. Table 4 presents the computational outcomes achieved by the MeanABC on $f11$-$f14$ and the other ABC variants with different dimensions, maximum cycle number, and maximum number of evaluations (D=30, MCN=500, FE=50,000), (D=60, MCN=1000, FE=100,000), and (D=100, MCN=1500, FE=150,000), respectively. See Gao (2014). The best results are shown in bold. In Table 4, the MeanABC achieved the best results (mean) over all the competing ABC variants for all different dimensions and the maximum number of evaluation cases. Also, the MeanABC results on $f11$-$f14$ were closer to the optimum solution and less prone to dimensionality increases in contrast to all other ABC variants on $f11$-$f14$.

FIGS. 8A-8H present the comparison of the convergence rate for some benchmark functions in terms of the number of iterations between the ABC variants (ABC, GABC, MABC, EABC) and the MeanABC algorithm. According to Gao, Liu, the right-hand side in FIGS. 8A-8H displays the convergence rate of the ABC variants, where the left-hand side in FIGS. 8A-8H displays the convergence rate of the Mean-ABC. It is noticed that the MeanABC algorithm converged substantially faster with a much smaller number of iterations. Also, other important observations about the convergence rate and the accuracy of the solution are presented in FIGS. 8A-8H.

MRI Brain Images Segmentation

The image segmentation process involves dividing an image into multiple segments (regions) that are sets of pixels. Image segmentation is usually used to recognize objects within an image. It is useful in several domains, such as MRI brain image segmentation to locate brain tumors and other pathologies, diagnosis, anatomical structure, and measure of tissue volumes. There are several MRI brain image segmentation methods that have been developed. See Alomoush et al.; Alomoush W, Omar K (2015) Dynamic fuzzy C-mean based firefly photinus search algorithm for MRI brain tumor image segmentation. In: Computer Science 2015. Universiti Kebangsaan Malaysia, Malaysia, p 180; Alia O, Rajeswari M, Aziz M E (2011) Harmony search-based fuzzy clustering algorithms for image segmentation. In: Computer science 2011. Universiti Sains Malaysia, Malaysia, p 200; Ghosh P, Mali K, Das S K (2018) Chaotic firefly algorithm-based fuzzy C-means algorithm for segmentation of brain tissues in magnetic resonance images. J Vis Commun Image Represent 54:63-79; and Alomoush W et al (2014) MRI brain segmentation via hybrid firefly search algorithm. J Theor Appl Inf Technol 61(1):1, each incorporated herein by reference in their entirety. The fuzzy C-means FCM algorithm can handle overlapping regions and can maintain a lot of information in comparison with hard segmentation approaches.

The standard FCM algorithm works well on most noise-free images, but it is sensitive to noise. FCM does not have any information about the spatial context that causes it to be sensitive to noise and imaging artifacts. See Shen S et al (2005) MRI fuzzy segmentation of brain tissue using neighborhood attraction with neural-network optimization. IEEE Trans Inf Technol Biomed 9(3):459-467; Alia O, Mandava R, Aziz M E (2011) A hybrid harmony search algorithm for MRI brain segmentation. Evol Intell 4(1):31-49; Bose A, Mali K (2016) Fuzzy-based artificial bee colony optimization for gray image segmentation. SIViP 10(6):1089-1096; and Alomoush W K et al (2014) Segmentation of MRI brain images using FCM improved by firefly algorithms. J Appl Sci 14(1):66-71, each incorporated herein by reference in their entirety.

Figure 9:
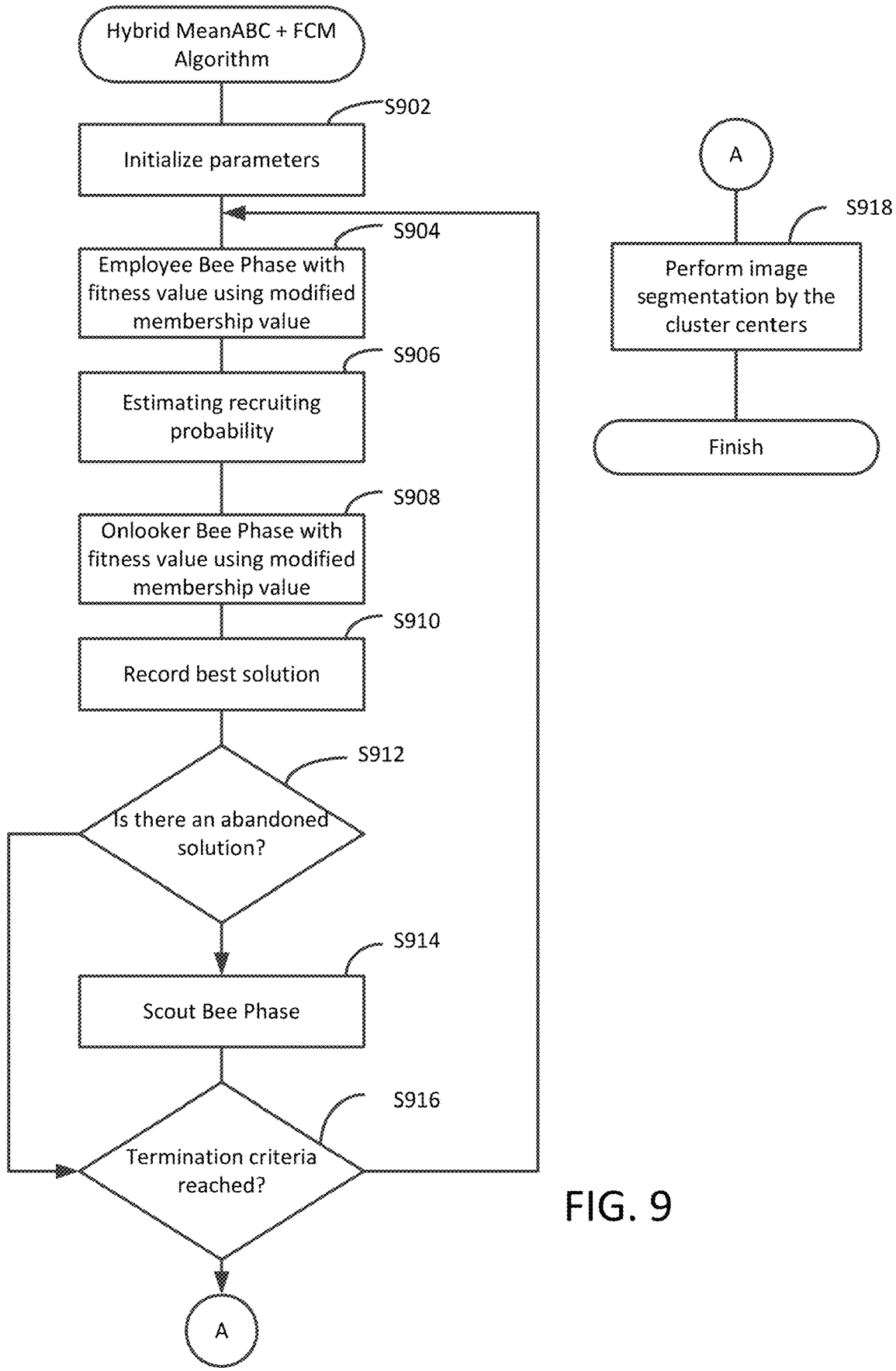
FIG. 9 is a flowchart of the MeanABC-FCM image segmentation method in accordance with an exemplary aspect of the disclosure.

In one or more embodiments, a hybrid approach combines the MeanABC algorithm and a fuzzy C-means algorithm, and is referred to as a MeanABC-FCM algorithm. FIG. 9 is a flowchart of the MeanABC-FCM image segmentation method in accordance with an exemplary aspect of the disclosure. FIG. 10 illustrates a pseudo-code of the MeanABC-FCM algorithm. Steps S902, S906, S910, S912, S914, S916 are as in steps S402, S406, S410, S412, S414, S416 of FIG. 4 The Employee Bee Phase, step S904, and Onlooker Bee Phase, step S908, include using the mean of previous best solutions in equation 5 of the MeanABC algorithm. In addition, the MeanABC-FCM algorithm uses FCM in the fitness function in steps S904 and S908 (see lines 8, 9 and 22, 23 of FIG. 10). In other words, the MeanABC Algorithm is used to find the best solution based on pixel locations, that are calculated using objective function. The best pixel locations used as cluster centroids, The MeanABC-FCM algorithm is employed as a cluster algorithm, which uses the cluster centroids to perform a segmentation process.

The MeanABC-FCM algorithm is an unsupervised clustering algorithm that uses the capability of the MeanABC algorithm to search for the optimum solution based on pixel locations in which the best pixel locations are cluster centroids for FCM. To reduce sensitivity to noise, the MeanABC-FCM algorithm uses a reformulated objective function of FCM-based fuzzy type 2, which is a reformulated and modified version of the FCM's objective function, as in Eq. 6.

$$J_i = \sum_{j=1}^{n} \sum_{k \in C_j} h_{kj}^2 * D_{kj} \qquad (6)$$

Here $h_{kj}$ is the membership values, but does not calculate the membership value as in the standard FCM objective function. The calculation for the new membership value reduces sensitivity to noise and computational time. The new membership value is calculated as in Eq. 7.

$$h_{kj} = \mu_{kj} - \frac{1 - \mu_{kj}}{2} \qquad (7)$$

where $\mu_{kj}$ is the degree of membership of pixel k to the jth cluster and $D_{kj}$ of Eq. 6 is the distance between the kth pixel and the jth cluster center, while Ji is the objective function of the ith food source. In order to reach the optimal solution, the main goal is to minimize the objective function Ji. In this case, the minimum value of the objective function represents the best similarity between the pixels in the same cluster. This approach to calculating the new membership value help to reduce the algorithm's sensitivity to noise.

In order to perform image segmentation, in S918 (line 38 in FIG. 10), the optimal clusters and cluster centers determined over generations of the FCM objective function represent the segmented 3-D MRI image. The image segmentation of MRI brain images includes segments for white matter (WM), gray matter (GM) and cerebrospinal fluid (CSF).

Real Brain Volumes

The performance of the MeanABC-FCM algorithm has been evaluated by using the algorithm for image segmentation of a set of real brain 3-D volumes. For purposes of this evaluation, these images were taken from the Internet Brain Segmentation Repository (IBSR). See IBSR (2013) Internet brain segmentation repository. Technical report, Massachusetts General Hospital, Center for Morphometric Analysis. September 2013 (cited March 2016) www.nitrc.org/projects/ibsr, incorporated herein by reference in its entirety. This set images consists of 20 volumes MR brain datasets and each volume includes 20 images which is a total of 400 images that are used. In the case of MR brain scans, the dimensions of a voxel are given by a pixel, together with the thickness of the slice (the measurement along the third axis). Also, corresponding manual segmentation results were obtained by way of analysis by experts. These images of brain volumes comprise brainT1WI with a resolution of 256×256× 64. The voxel size for these images is 1:17×1:17×3:1 mm³ and was obtained from different 1.5-Tesla GE/Siemens MR scanners. These images have many problems that are typical of MR segmentation of brain images such as noise, very high nonuniformity in spatial intensity, and complexities related to variation in shape. See Alia et al.; and Peng Z (2006) Segmentation of white matter, gray matter, and CSF from MR brain images and extraction of vertebrae from MR spinal images. University of Cincinnati, each incorporated herein by reference in their entirety.

Figure 11A:
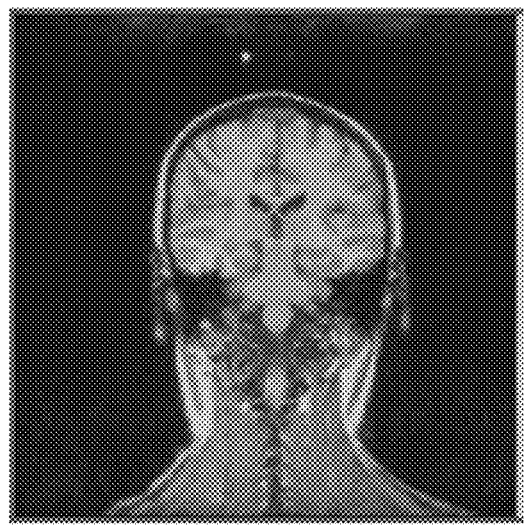
FIGS. 11A-11C illustrate MRI real brain images of removable skull, a Original brain coronal-T1W1 slice (#22) of volume number 16_3 in the (IBSR). b Ground truth images. c Region of interest.
Figure 11B:
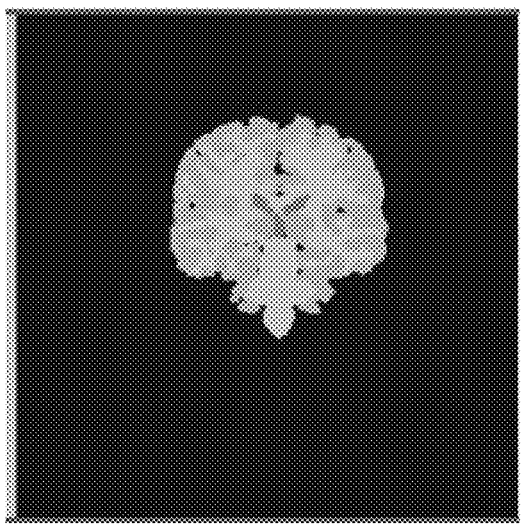
Figure 11C:
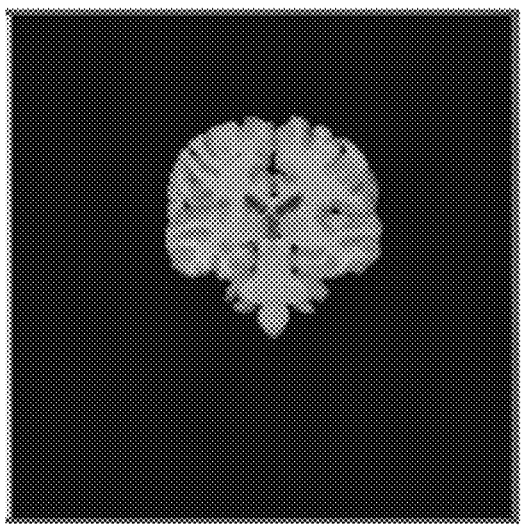

In this embodiment, the image data related to skull and bone, which are called the extracranial tissues, were removed by utilizing the results of manual segmentation done by the experts at the beginning of the image segmentation. FIGS. 11A-11C illustrate MRI brain images with the skull removed. FIG. 11A is an original brain coronal-T1W1 slice. FIG. 11B illustrates a ground truth image. FIG. 11C illustrates a region of interest. This image data has been achieved by developing a mask from the images of ground truth, as for example in FIG. 11B, and using it as a superimposed image on the brain images for the purpose of filtering out the redundant data.

After the removal of image data related to undesired tissue and air, the resultant image contains only the information about the intracranial tissue, for example as seen in FIG. 11C. This resulting image is then used in the segmentation methods. The results of segmentation methods are evaluated by the quantization index of the Tanimoto coefficient (T) between [0, 1]. See, Alomoush et al.; Alia and Rajeswari et al. (2011); Alia and Mandava et al. (2011); Duda R O, Hart P E, Stork D G (2012) Pattern classification. Wiley, New York; Alomoush W et al (2014) MRI brain segmentation via hybrid firefly search algorithm. J Theor Appl Inf Technol 61(1):73-90; and Ahmadvand A, Daliri M R, Zahiri S M (2017) Segmentation of brain MR images using a proper combination of DCS based method with MRF. Multimed Tools Appl 77(7):8001-8018, each incorporated herein by reference in their entirety. The Tanimoto coefficient (7) is the accuracy rate and is calculated based on matching the segmented image by MeanABC-FCM and the ground truth image. The Tanimoto coefficient (T) is considered as an overlap metric and is reported on the IBSR website. It is computed as in Eq. 8.

$$T = \frac{|A \cap B|}{|A \cup B|}, \qquad (8)$$

where A indicates the number of voxels of the ground truth and B indicates the number of voxels in the segmented image produced by the MeanABC-FCM algorithm. The better matching between A and B is, the upper bound value for T equals 1. The Tanimoto coefficient has the same analysis as the overlap metric reported in the (IBSR) site and also in the published results pertaining to other related works. See Alomoush W K et al. (2014); Alia and Rajeswari et al. (2011); Ghosh et al.; Alia and Mandava et al. (2011); Duda et al.; Alomoush W et al. (2014); Ahmadvand et al.; field rule for non-parametric MRI intensity inhomogeneity estimation algorithm. Neurocomputing 72(16):3556-3569; Mayer A, Greenspan H (2009) An adaptive mean-shift framework for MRI brain segmentation. IEEE Trans Med Imaging 28(8):1238-1250; and Jiménez-Alaniz J R, Medina-Banuelos V, Yanez-Suirez O (2006) Data-driven brain MRI segmentation supported on edge confidence and a priori tissue information. IEEE Trans Med Imaging 25(1):74-83, each incorporated herein by reference in their entirety.

In this embodiment, the MeanABC-FCM is compared with other image segmentation methods such as chaotic firefly algorithm-based fuzzy C-means algorithm C-FAFCM, the clustering-based harmony search HSFCM, and clustering-based firefly algorithm FFCM. See Ghosh et al.; Alia and Rajeswari et al. (2011); Alia and Mandava et al. (2011); Alomoush et al (2015); and Alomoush W. et al. (2014). The MeanABC-FCM algorithm is also compared to the outcomes of many approaches, as were reported in IBSR, such as maximum a posteriori probability (MAP), adaptive MAP (AMAPFCM), maximum likelihood (MLC), tree-structure K-means (TSK), FMIRB FAST, CGMM, MS-edge, Bias MAP (BMAP) and AMS. The parameter settings for the MeanABC-FCM follow the parameter setting in Alomoush et al. (2015), Alia and Rajeswari et al. (2011), Ghosh et al., and Alomoush et al. (2014), because all of these studies used IBSR images or grayscale images, which have the same characteristics of IBSR images, where the population size is 100, called, SN=50, limit=100, maximum cycle number (MCN)=2000, nonnegative constant parameter C=1.43, and weighting exponent m=2. See Ouadfel S, Meshoul S (2012) Handling fuzzy image clustering with a modified ABC algorithm. Int J Intell Syst Appl 4(12):65; and Salima O, Taleb-Ahmed A, Mohamed B (2012) Spatial information based image clustering with a swarm approach. IAES Int J Artif Intell 1(3):149-160, each incorporated herein by reference in their entirety.

In Tables 5, 6, and 7, the results of Tanimoto coefficients analysis for the CSF, GM, and WM tissues for each individual brain dataset were tested. Tanimoto coefficients T obtained by the MeanABC-FCM and also the evaluations for 9 other established segmentation algorithms are reported in Alomoush et al. (2015), Alia and Rajeswari et al. (2011), Ghosh et al., and Alomoush et al. (2014). In Tables 5, 6, and 7, the first column represents 20 brain volumes of the dataset and each volume has 20 slices, which means that 400 slices are segmented by the MeanABC-FCM and other related works. Also, it is evaluated by the T index. For the rest of the columns, the T values are available for all clustering approaches in these experiments.

Figure 12:
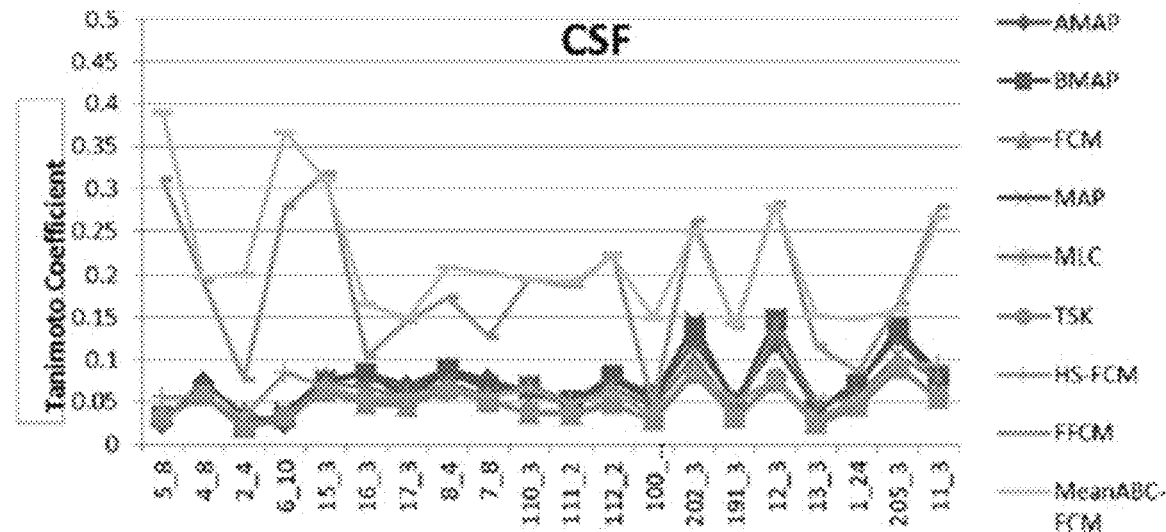
FIG. 12 is a graph illustrating the Tanimoto coefficient T for 20 Real MRI brain images by MeanABC-FCM and other related works for CSF.

Table 5 represents the T index values by MeanABC-FCM and other segmentation methods on the cerebrospinal fluid (CSF) regions for all volumes and slices. It clearly shows that the MeanABC-FCM outcomes from CSF regions are better than most of those produced by other approaches, with the exclusion of FFCM in only six cases, but the average of the MeanABC-FCM results are better than those of the FFCM for CSF as in Table 5. FIG. 12 shows the Tanimoto coefficient T for 20 real MRI brain images by the MeanABC-FCM and other related works for CSF.

TABLE 5

Tanimoto coefficients of the CSF segmentation results for 20 brain volumes from IBSR using MeanABC-FCM compared with other segmentation methods

| Brain volumes | AMAP | BMAP | FCM | MAP | MLC | TSK | HS-FCM | FFCM | MeanABC-FCM |
|---|---|---|---|---|---|---|---|---|---|
| 5_8 | 0.025 | 0.034 | 0.033 | 0.032 | 0.033 | 0.032 | 0.055 | 0.311 | 0.389 |
| 4_8 | 0.073 | 0.059 | 0.059 | 0.06 | 0.06 | 0.058 | 0.057 | 0.193 | 0.198 |
| 2_4 | 0.035 | 0.021 | 0.02 | 0.02 | 0.02 | 0.02 | 0.033 | 0.077 | 0.201 |
| 6_10 | 0.025 | 0.034 | 0.034 | 0.038 | 0.031 | 0.034 | 0.084 | 0.378 | 0.366 |
| 15_3 | 0.076 | 0.074 | 0.001 | 0.077 | 0.072 | 0.064 | 0.068 | 0.319 | 0.311 |
| 16_3 | 0.084 | 0.083 | 0.048 | 0.083 | 0.066 | 0.054 | 0.053 | 0.104 | 0.165 |
| 17_3 | 0.069 | 0.055 | 0.046 | 0.059 | 0.055 | 0.05 | 0.058 | 0.146 | 0.149 |
| 8_4 | 0.089 | 0.086 | 0.064 | 0.09 | 0.072 | 0.064 | 0.062 | 0.173 | 0.209 |
| 7_8 | 0.076 | 0.064 | 0.051 | 0.069 | 0.055 | 0.05 | 0.056 | 0.127 | 0.202 |
| 110_3 | 0.062 | 0.068 | 0.037 | 0.063 | 0.071 | 0.039 | 0.065 | 0.195 | 0.195 |
| 111_2 | 0.047 | 0.051 | 0.035 | 0.047 | 0.046 | 0.038 | 0.049 | 0.187 | 0.191 |
| 112_2 | 0.076 | 0.08 | 0.048 | 0.079 | 0.067 | 0.049 | 0.060 | 0.223 | 0.222 |
| 100_23 | 0.052 | 0.058 | 0.029 | 0.051 | 0.045 | 0.029 | 0.035 | 0.048 | 0.149 |
| 202_3 | 0.122 | 0.137 | 0.083 | 0.144 | 0.104 | 0.086 | 0.087 | 0.263 | 0.251 |
| 191_3 | 0.051 | 0.047 | 0.032 | 0.043 | 0.035 | 0.032 | 0.050 | 0.138 | 0.142 |
| 12_3 | 0.119 | 0.147 | 0.073 | 0.148 | 0.138 | 0.078 | 0.076 | 0.283 | 0.279 |
| 13_3 | 0.041 | 0.04 | 0.024 | 0.04 | 0.047 | 0.025 | 0.031 | 0.116 | 0.151 |
| 1_24 | 0.072 | 0.07 | 0.045 | 0.068 | 0.056 | 0.047 | 0.053 | 0.086 | 0.148 |
| 205_3 | 0.126 | 0.137 | 0.089 | 0.136 | 0.104 | 0.091 | 0.096 | 0.166 | 0.158 |
| 11_3 | 0.077 | 0.081 | 0.054 | 0.077 | 0.077 | 0.056 | 0.093 | 0.279 | 0.267 |

Figure 13:
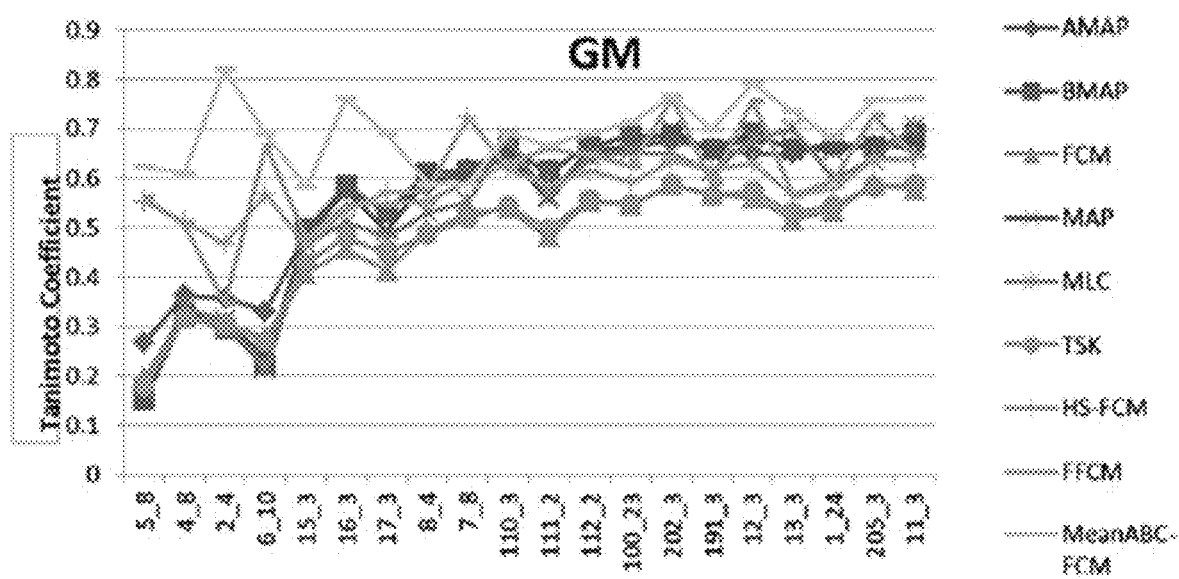
FIG. 13 is a graph illustrating the Tanimoto coefficient T for 20 real MRI brain images by MeanABC-FCM and other related works for GM.

Also, Table 6 contains the T index values from gray matter (GM) for all clustering approaches. The MeanABC-FCM is better than most other approaches, with the exclusion of AMAP and BMAP in two cases as in volumes 8_4, 7_8 C-FAFCM in two cases as in volumes 11-_3 and 191_3, but the average of the MeanABC-FCM results are better than that of all related works for GM as in Table 6. Also, FIG. 13 shows the Tanimoto coefficient T for 20 real MRI brain images by MeanABC-FCM and other related works for GM.

TABLE 6

Tanimoto coefficient of the GM segmentation results for 20 brain volumes from IBSR ming MeanABC-RCM compared with other methods

| Brain volumes | AMAP | BMAP | FOM | MAP | MLC | TSK | HS-FCM | FFCM | C-FAFCM | MeanABC-FCM |
|---|---|---|---|---|---|---|---|---|---|---|
| 5_8 | 0.268 | 0.153 | 0.196 | 0.152 | 0.173 | 0.181 | 0.552 | 0.561 | 0.287 | 0.624 |
| 4_8 | 0.363 | 0.323 | 0.327 | 0.33 | 0.34 | 0.317 | 0.512 | 0.508 | 0.454 | 0.612 |
| 2_4 | 0.356 | 0.297 | 0.305 | 0.312 | 0.31 | 0.305 | 0.467 | 0.346 | 0.455 | 0.82 |
| 6_10 | 0.33 | 0.224 | 0.279 | 0.239 | 0.213 | 0.27 | 0.568 | 0.666 | 0.367 | 0.69 |
| 15_3 | 0.492 | 0.497 | 0.408 | 0.482 | 0.468 | 0.429 | 0.462 | 0.478 | 0.523 | 0.582 |
| 16_3 | 0.577 | 0.585 | 0.456 | 0.577 | 0.511 | 0.48 | 0.538 | 0.547 | 0.579 | 0.76 |
| 17_3 | 0.535 | 0.531 | 0.413 | 0.495 | 0.48 | 0.448 | 0.572 | 0.548 | 0.577 | 0.689 |
| 8_4 | 0.584 | 0.612 | 0.492 | 0.599 | 0.53 | 0.487 | 0.576 | 0.555 | 0.608 | 0.589 |
| 7_8 | 0.62 | 0.614 | 0.53 | 0.604 | 0.553 | 0.52 | 0.723 | 0.592 | 0.618 | 0.589 |
| 110_3 | 0.652 | 0.662 | 0.538 | 0.647 | 0.682 | 0.543 | 0.519 | 0.630 | 0.662 | 0.691 |
| 111_2 | 0.569 | 0.613 | 0.482 | 0.56 | 0.564 | 0.498 | 0.587 | 0.659 | 0.667 | 0.666 |

TABLE 6-continued

Tanimoto coefficient of the GM segmentation results for 20 brain volumes from IBSR ming MeanABC-RCM compared with other methods

| Brain volumes | AMAP | BMAP | FOM | MAP | MLC | TSK | HS-FCM | FFCM | C-FAFCM | MeanABC-FCM |
|---|---|---|---|---|---|---|---|---|---|---|
| 112_2 | 0.648 | 0.653 | 0.554 | 0.656 | 0.644 | 0.557 | 0.816 | 0.647 | 0.675 | 0.69 |
| 100_23 | 0.662 | 0.684 | 0.547 | 0.665 | 0.652 | 0.547 | 0.501 | 0.625 | 0.695 | 0.713 |
| 202_3 | 0.676 | 0.685 | 0.588 | 0.697 | 0.649 | 0.587 | 0.637 | 0.763 | 0.706 | 0.765 |
| 191_3 | 0.659 | 0.659 | 0.568 | 0.651 | 0.613 | 0.565 | 0.619 | 0.590 | 0.72 | 0.697 |
| 12_3 | 0.649 | 0.002 | 0.56 | 0.685 | 0.68 | 0.574 | 0.630 | 0.756 | 0.741 | 0.791 |
| 13_3 | 0.65 | 0.657 | 0.516 | 0.659 | 0.698 | 0.531 | 0.566 | 0.566 | 0.695 | 0.735 |
| 12_4 | 0.663 | 0.669 | 0.534 | 0.656 | 0.599 | 0.545 | 0.580 | 0.598 | 0.587 | 0.68 |
| 205_3 | 0.666 | 0.661 | 0.588 | 0.666 | 0.638 | 0.583 | 0.639 | 0.727 | 0.724 | 0.458 |
| 11_3 | 0.661 | 0.689 | 0.579 | 0.683 | 0.705 | 0.587 | 0.639 | 0.646 | 0.718 | 0.76 |

Figure 14:
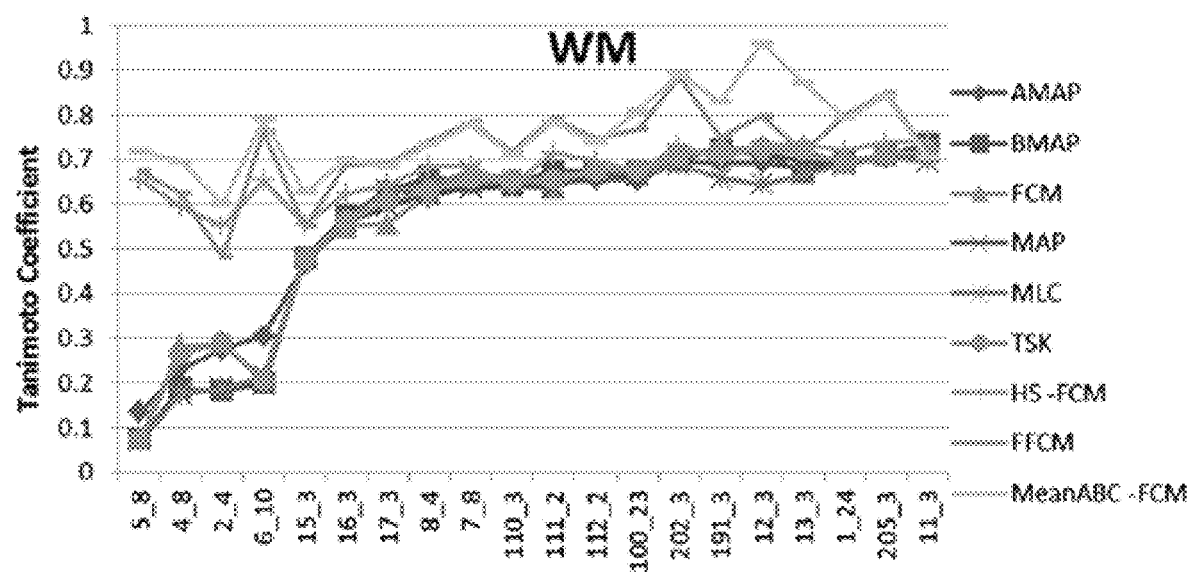
FIG. 14 is a graph illustrating the Tanimoto coefficient T for 20 real MRI brain images by MeanABC-FCM and other related works for WM.

Furthermore, Table 7 includes Tanimoto coefficient T values from white matter (WM) for all clustering approaches. The MeanABC-FCM outcomes from WM regions are better than those of other approaches, with the exclusion of FFCM in 9 cases, but the average of MeanABC-FCM results is better than that of FFCM for WM as in Table 7. Additionally, FIG. 14 shows Tanimoto coefficient T for 20 realMRI brain images by MeanABC-FCM and other related works for WM.

TABLE 7

Tanimoto coefficients of the WM segmentation results for 20 brain volumes from IBSR using MeanABC-FCM compared with other methods

| Brain volumes | AMAP | BMAP | FCM | MAP | MLC | TSK | HS-FCM | FFCM | C-FAFCM | MeanABC-FCM |
|---|---|---|---|---|---|---|---|---|---|---|
| 5_8 | 0.134 | 0.075 | 0.075 | 0.069 | 0.07 | 0.074 | 0.656 | 0.674 | 0.553 | 0.719 |
| 4_8 | 0.233 | 0.188 | 0.283 | 0.178 | 0.174 | 0.267 | 0.594 | 0.624 | 0.665 | 0.697 |
| 2_4 | 0.276 | 0.182 | 0.289 | 0.185 | 0.188 | 0.289 | 0.552 | 0.482 | 0.662 | 0.601 |
| 6_10 | 0.305 | 0.2 | 0.205 | 0.199 | 0.214 | 0.207 | 0.654 | 0.763 | 0.539 | 0.79 |
| 15_3 | 0.466 | 0.48 | 0.479 | 0.476 | 0.479 | 0.479 | 0.554 | 0.550 | 0.701 | 0.627 |
| 16_3 | 0.567 | 0.573 | 0.548 | 0.561 | 0.564 | 0.563 | 0.624 | 0.689 | 0.745 | 0.702 |
| 17_3 | 0.634 | 0.628 | 0.558 | 0.594 | 0.631 | 0.606 | 0.645 | 0.692 | 0.735 | 0.685 |
| 8_4 | 0.617 | 0.661 | 0.623 | 0.625 | 0.642 | 0.632 | 0.687 | 0.741 | 0.742 | 0.734 |
| 7_8 | 0.642 | 0.65 | 0.65 | 0.636 | 0.674 | 0.66 | 0.687 | 0.785 | 0.765 | 0.778 |
| 110_3 | 0.646 | 0.644 | 0.653 | 0.64 | 0.655 | 0.655 | 0.640 | 0.719 | 0.798 | 0.712 |
| 111_2 | 0.648 | 0.676 | 0.637 | 0.638 | 0.645 | 0.654 | 0.714 | 0.792 | 0.788 | 0.785 |
| 112_2 | 0.657 | 0.673 | 0.677 | 0.67 | 0.676 | 0.676 | 0.697 | 0.747 | 0.8 | 0.74 |
| 100_23 | 0.656 | 0.673 | 0.674 | 0.663 | 0.671 | 0.674 | 0.675 | 0.769 | 0.811 | 0.811 |
| 202_3 | 0.696 | 0.7 | 0.712 | 0.704 | 0.688 | 0.708 | 0.732 | 0.885 | 0.809 | 0.892 |
| 191_3 | 0.692 | 0.723 | 0.723 | 0.72 | 0.658 | 0.72 | 0.697 | 0.752 | 0.813 | 0.829 |
| 12_3 | 0.693 | 0.717 | 0.721 | 0.713 | 0.645 | 0.727 | 0.732 | 0.798 | 0.831 | 0.961 |
| 13_3 | 0.683 | 0.672 | 0.714 | 0.698 | 0.666 | 0.722 | 0.733 | 0.717 | 0.712 | 0.872 |
| 1_24 | 0.691 | 0.695 | 0.692 | 0.687 | 0.691 | 0.692 | 0.721 | 0.800 | 0.751 | 0.793 |
| 205_3 | 0.704 | 0.71 | 0.716 | 0.713 | 0.707 | 0.711 | 0.739 | 0.849 | 0.805 | 0.842 |
| 11_3 | 0.711 | 0.737 | 0.718 | 0.716 | 0.696 | 0.716 | 0.742 | 0.712 | 0.821 | 0.705 |

Figure 15:
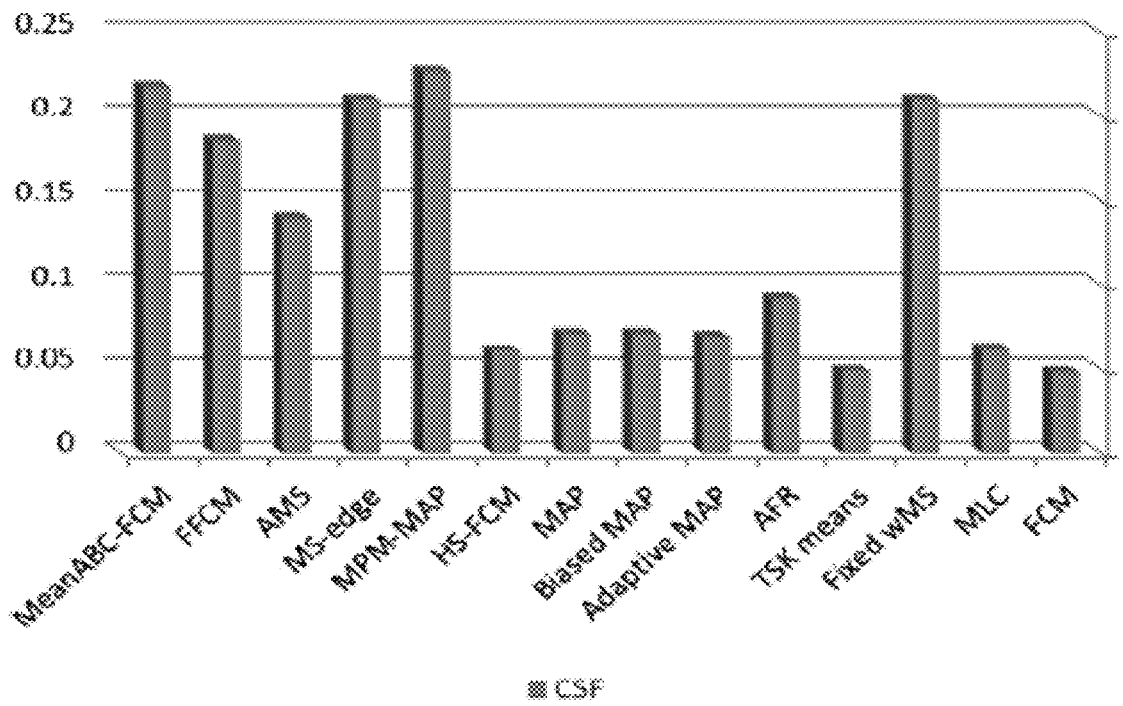
FIG. 15 is a graph illustrating the Average Tanimoto coefficient T for 20 real MRI brain images by MeanABC-FCM and other related works for CSF.
Figure 16:
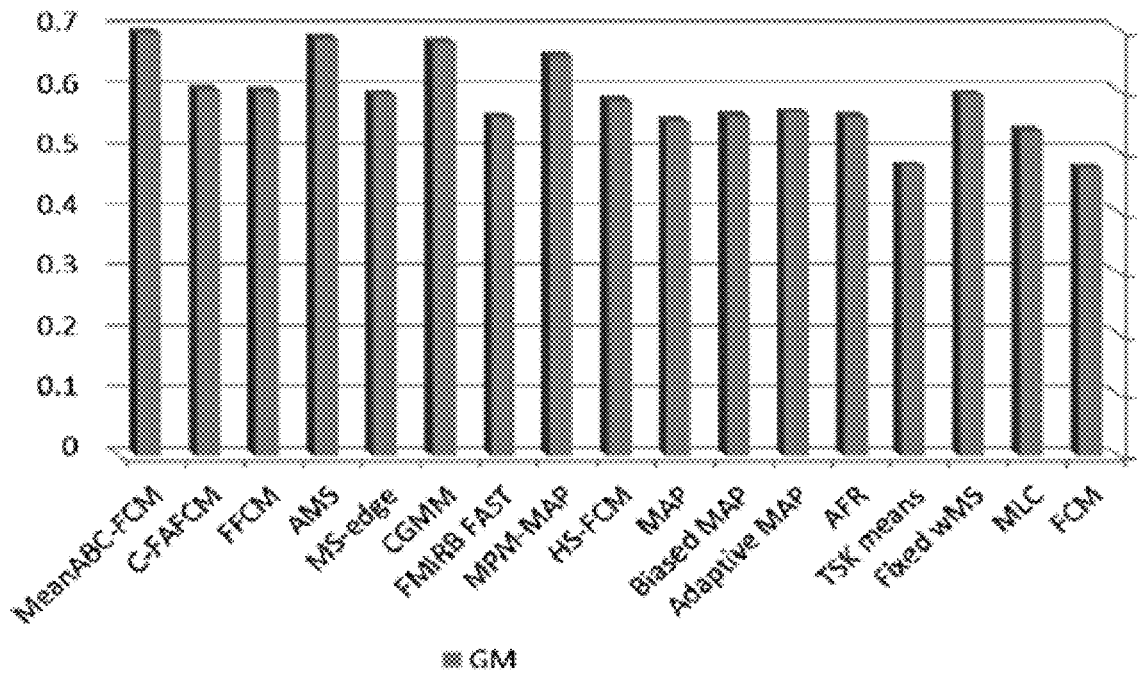
FIG. 16 is a graph illustrating the Average Tanimoto coefficient T for 20 real MRI brain images by MeanABC-FCM and other related works for GM.
Figure 17:
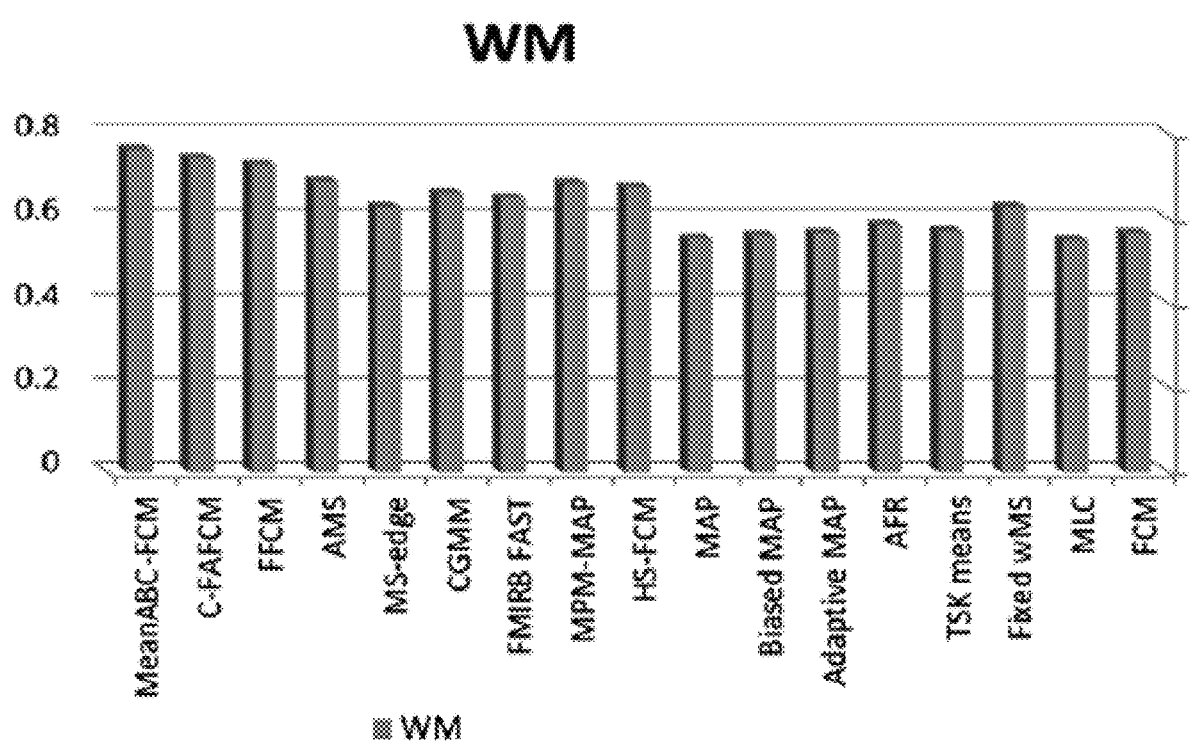
FIG. 17 is a graph illustrating the average Tanimoto coefficient T for 20 Real MRI brain images by MeanABC-FCM and other related works for WM.
Figure 18A:
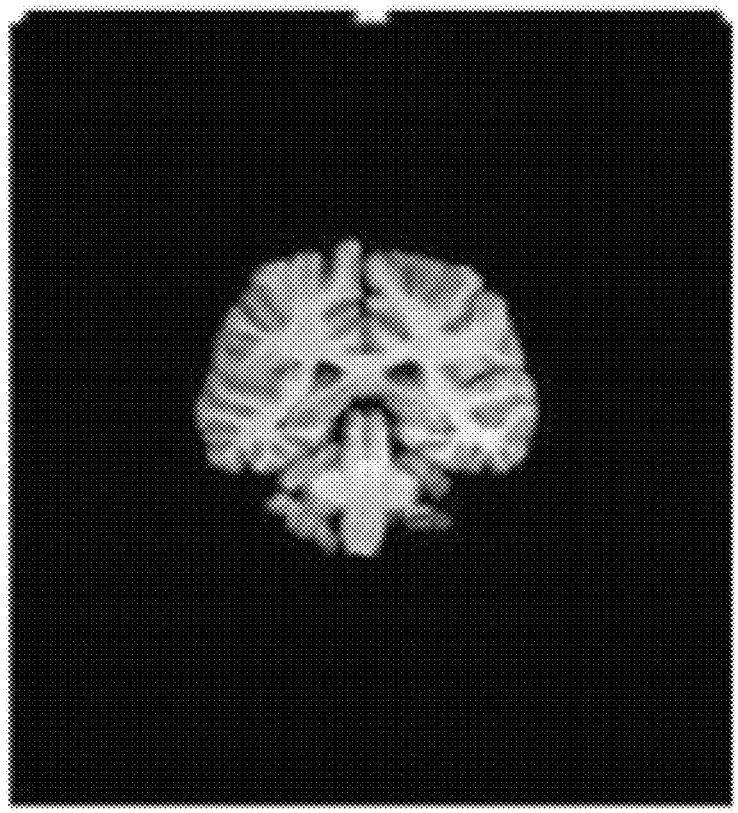
FIGS. 18A-18D illustrate a original MRI volume (1_24), b ground MRI truth volume (1_24), c segmented MRI volume (1_24) by FFCM and d segmented MRI volume (1_24) by MeanABC-FCM.
Figure 18B:
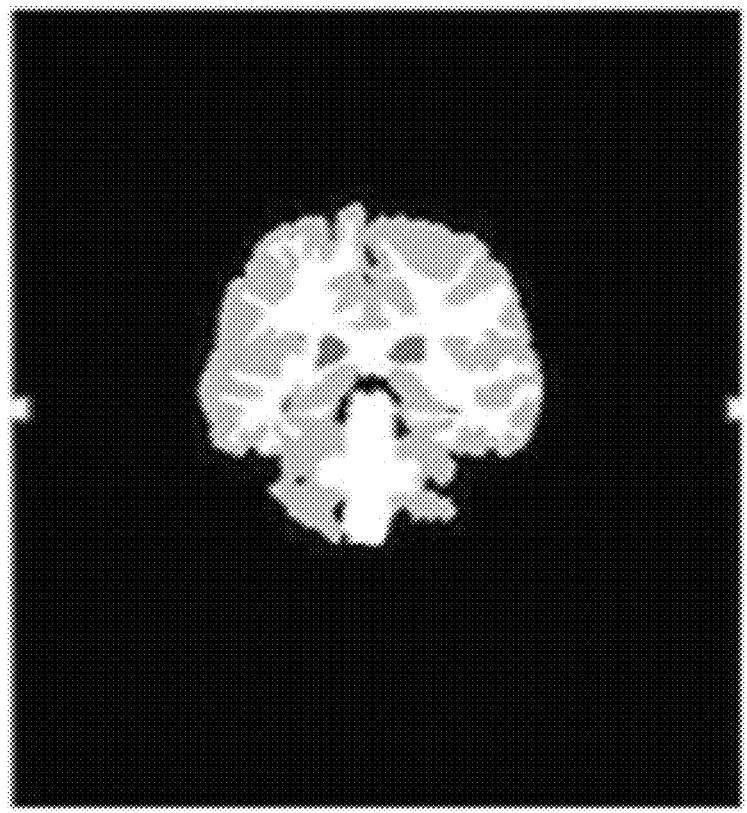
Figure 18C:
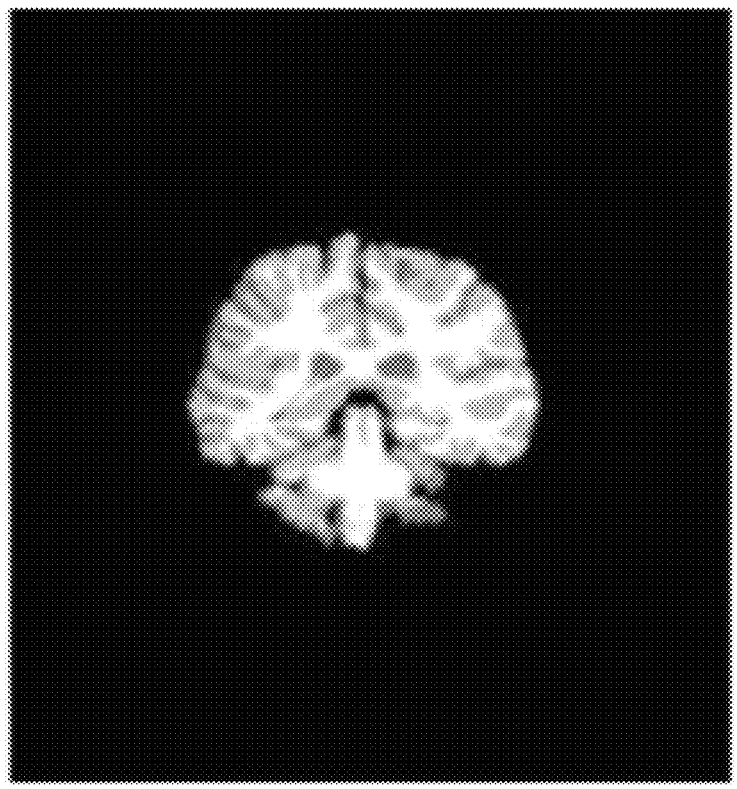
Figure 18D:
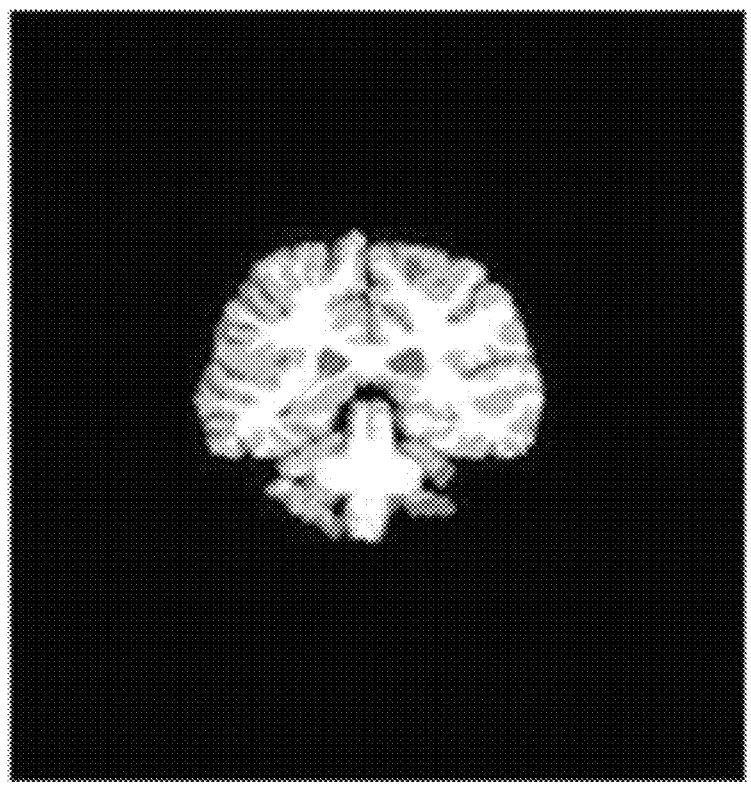
Figure 19A:
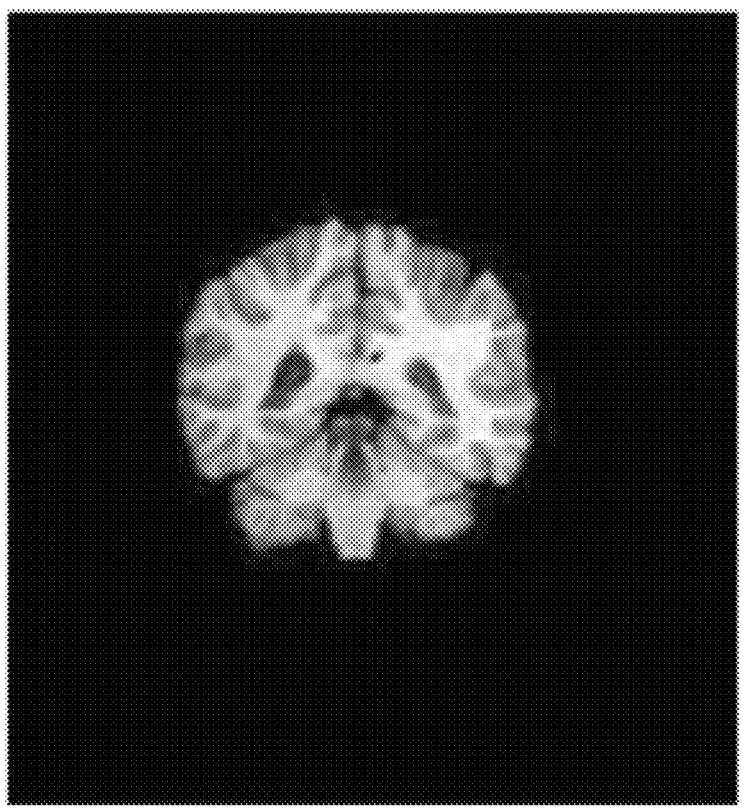
FIGS. 19A-19D illustrate a original MRI volume (8_4), b Ground truth MRI volume (8_4), c segmented MRI volume (8_4) by FFCM and d segmented MRI volume (8_4) by MeanABC-FCM.
Figure 19B:
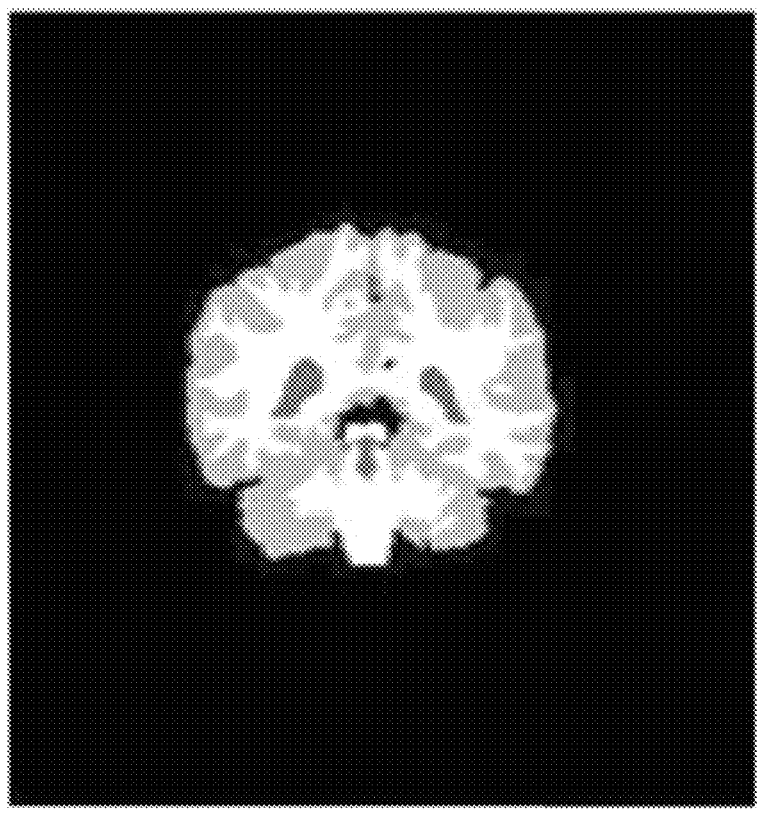
Figure 19C:
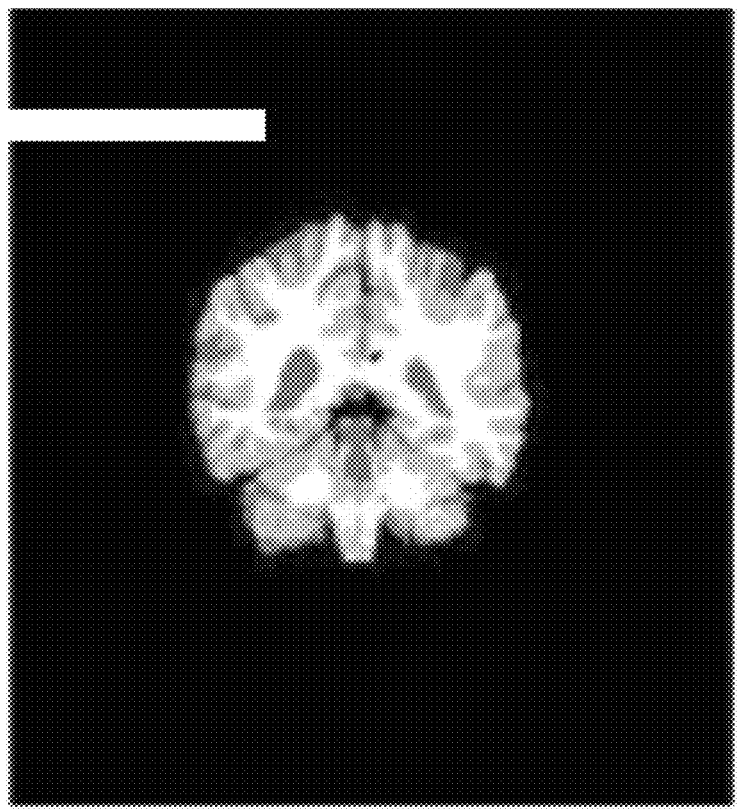
Figure 19D:
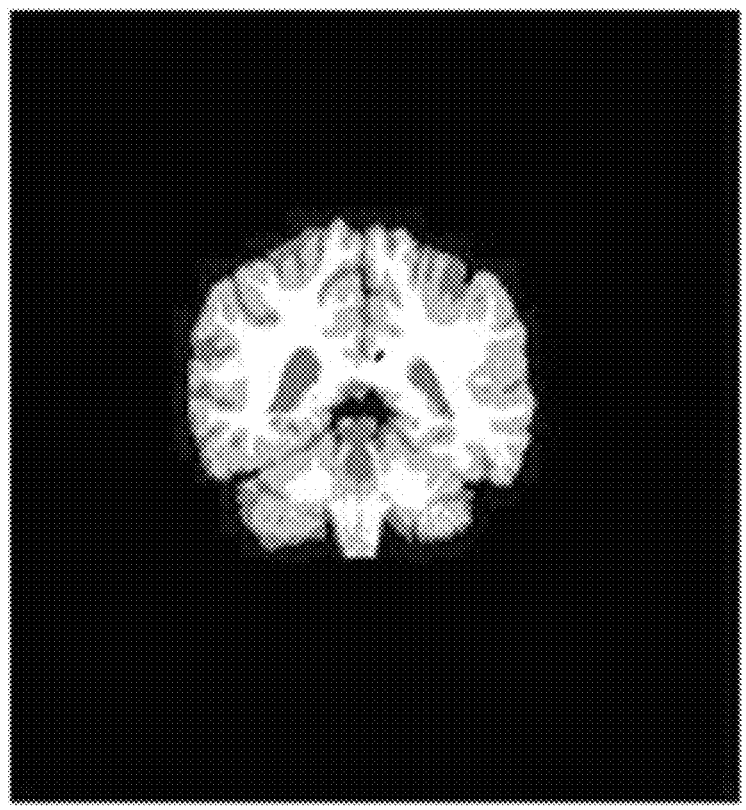
Figure 20A:
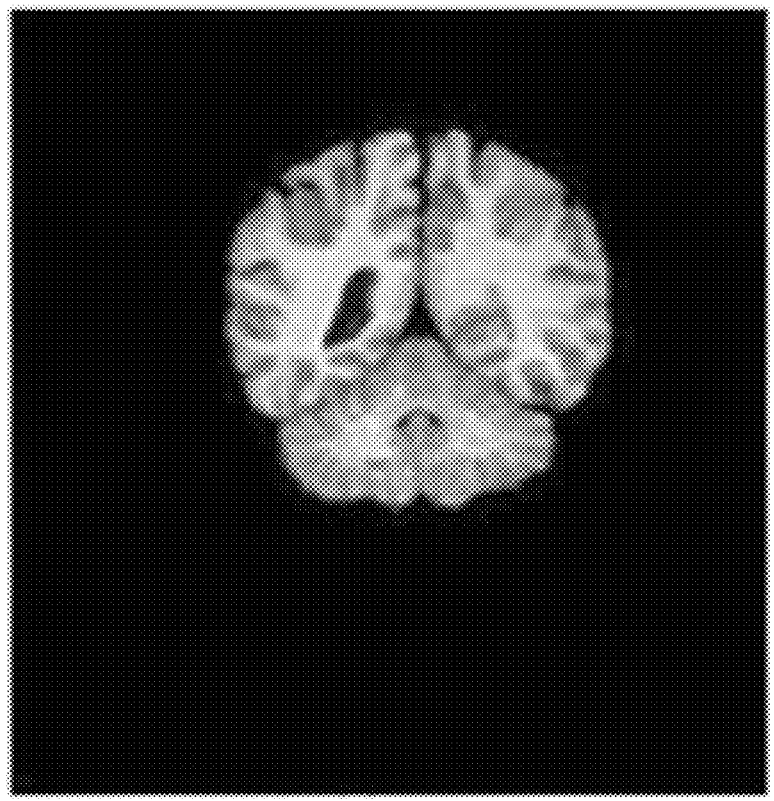
FIGS. 20A-20D illustrate a original MRI volume (205_3), b ground truth MRI volume (205_3), c segmented MRI volume (205_3) by FFCM and d segmented MRI volume (205_3) by MeanABC-FCM.
Figure 20B:
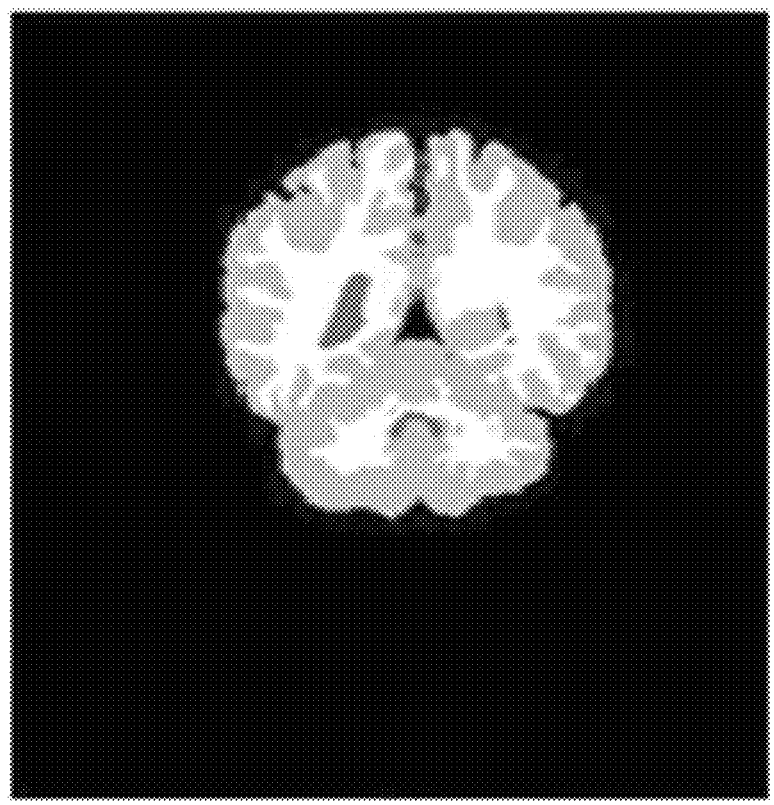
Figure 20C:
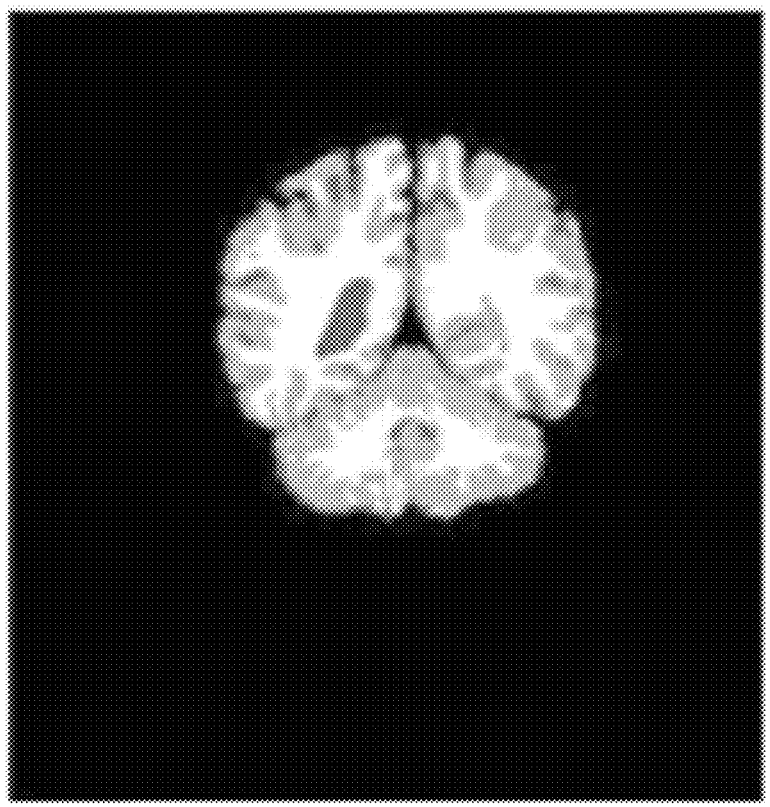
Figure 20D:
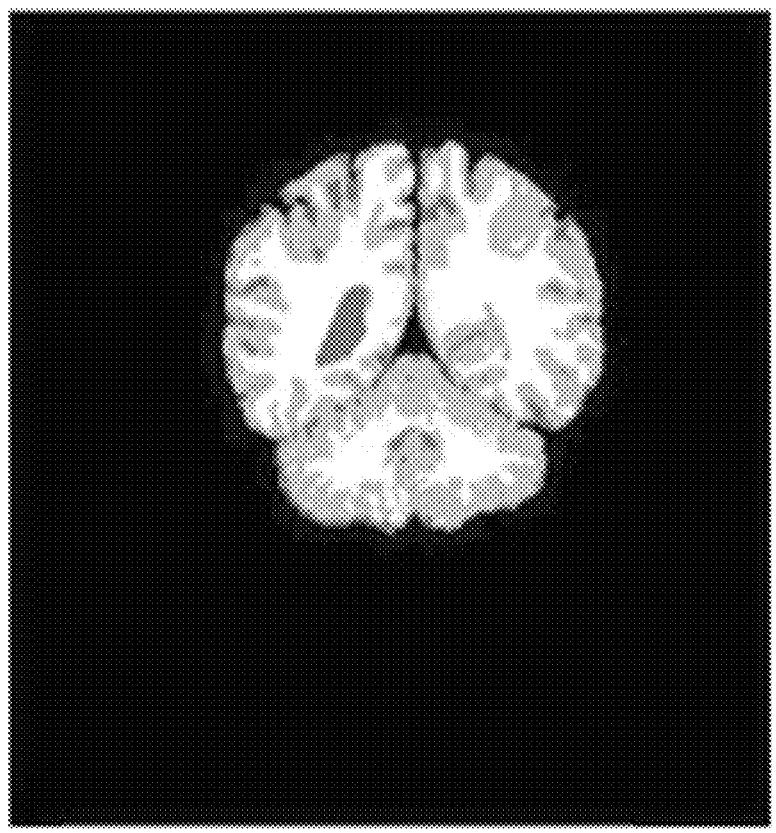

However, the outcomes of Tanimoto coefficients analysis of their average results are available for the differentiation of CSF, GM, and WM tissue types of the brain and are represented in Table 8 and FIGS. 15, 16, and 17. It is clearly shown that the MeanABC-FCM algorithm outperforms all methods from the IBSR Web site, FFCM, HS-FCM, and C-FAFCM. See IBSR (2013); Alomoush et al. (2014); Alia et al. (2011); and Ghosh et al. Meanwhile, MeanABC-FCM is competitive to MPM-MAP in CSF, where the C-FAFCM is not available.

TABLE 8

Average of Tanimoto coefficient (T) outcomes for Mean-ABC-FCM and various segmentation approaches

| | Method | CSF | GM | WM |
|---|---|---|---|---|
| 1 | FCM | 0.048 | 0.473 | 0.567 |
| 2 | MLC | 0.062 | 0.535 | 0.551 |

TABLE 8-continued

Average of Tanimoto coefficient (T) outcomes for Mean-ABC-FCM and various segmentation approaches

| | Method | CSF | GM | WM |
|---|---|---|---|---|
| 3 | Fixed wMS | 0.21 | 0.594 | 0.628 |
| 4 | TSK means | 0.049 | 0.477 | 0.571 |
| 5 | AFR | 0.092 | 0.557 | 0.587 |
| 6 | Adaptive MAP | 0.069 | 0.564 | 0.567 |

TABLE 8-continued

Average of Tanimoto coefficient (T) outcomes for Mean-ABC-FCM and various segmentation approaches

| | Method | CSF | GM | WM |
|---|---|---|---|---|
| 7 | Biased MAP | 0.071 | 0.558 | 0.562 |
| 8 | MAP | 0.071 | 0.55 | 0.554 |
| 9 | HS-FCM | 0.061 | 0.584 | 0.674 |
| 10 | MPM-MAP | 0.227 | 0.657 | 0.682 |
| 11 | FMIRB FAST | NA | 0.556 | 0.648 |
| 12 | CGMM | NA | 0.680 | 0.660 |
| 13 | MS-edge | 0.210 | 0.594 | 0.628 |
| 14 | AMS | 0.140 | 0.686 | 0.688 |
| 25 | MiM | 0.186 | 0.600 | 0.727 |
| 16 | C-FAFCM | NA | 0.6023 | 0.7418 |
| 17 | MeanABC-FCM | 0.2172 | 0.695 | 0.764 |

In general, the segmentation outcomes of the MeanABC-FCM for CSF, GM, and WM tissues are more robust than those of the state-of-the-art segmentation methods because the MeanABC-FCM has the capability to reduce the sensitivity to the noise by employing the reformulated FCM objective function with new membership matrix U. See Ghosh et al.; Alia et al. (2011); IBSR; and Alomoush W. et al. (2014). Also, most state-of-the-art methods have faced difficulties to distinguish and correctly classify the CSF, GM, and WM tissues. See Ghosh et al.; Alia et al. (2011); IBSR; and Alomoush W. et al. (2014). This is imputed for the reasons as follows: Firstly, the artifacts of the image affect the intensity levels of images that have overlap between regions as in brain tissues. Secondly, the IBSR datasets have a complex structure with high levels of noise which leads to incorrect classification by other state-of-the-art methods.

FIGS. 18A-18D, 19A-19D, and 20A-20D illustrate three sample volumes of IBSR brain image segmentation. These volumes include (1_24), (8_4), and (205_3) of the original MRI image, ground truth MRI image, segmented image by FFCM, and the segmented image by the MeanABC-FCM, (a)-(c), respectively.

In the above embodiments, a new and improved ABC algorithm variant called the MeanABC is disclosed. The MeanABC algorithm addresses the weak exploitative behavior of the original ABC algorithm. A modified search equation based on the information of the mean of the previous best solutions is included to balance exploration and exploitation processes. In order to highlight the importance of that balance on the performance of the disclosed algorithm, the MeanABC was tested on 14 benchmark functions as an optimization algorithm. In addition, it was employed as a hybrid with the FCM (MeanABC-FCM) algorithm and was applied to a set of 20 volumes of real brain MRI images with 20 images for each volume as an image segmentation technique. The results show that the ability of the MeanABC algorithm to find the optimum solution is significantly enhanced over the original ABC algorithm and outperformed other competing algorithms in the literature.

The MeanABC-FCM produced promising results compared to other MRI segmentation techniques in the literature. Numerous modifications and variations of the present invention are possible in light of the above teachings. It is therefore to be understood that within the scope of the appended claims, the invention may be practiced otherwise than as specifically described herein. The MeanABC algorithm may be applied to solving complex real-world continuous optimization problems such as clustering, grayscale image segmentation, and data mining. Moreover, the MeanABC algorithm can also be used to find solutions to optimization problems such as constraint, multi-objective, hybrid, composite functions, some non-linear-separable functions, and real-world practice optimization problems. Also, it has been determined that ABC variants should mainly focus on achieving appropriate activation of the scout bee phase on non-prospect sources of food regardless of the dimensionality of the problem.

The invention claimed is:

1. A method of 3-D image segmentation by processing circuitry, the method comprising:
    obtaining at least one 3-D Magnetic Resonance Image (MRI) image having a plurality of pixels;
    an employee phase including performing at least one search cycle comprising:
        generating a plurality of solutions in a neighborhood of an employed bee's current location, taking into account:
            (a) movement of the employed bee's current location toward a mean value of a positive direction of a global best location and a positive direction of its own best location, wherein the bee's current location is a location of a pixel of the 3-D MRI image and the global best location is a center of a cluster,
            (b) movement of the employed bee's current location toward the mean value of the positive direction of its own best location and a negative direction of the global best location, and
            (c) a random number;
        calculating a fitness value for each of the plurality of solutions based on membership values and distances to the cluster centers, wherein each of the membership values is determined based on a degree of membership of the pixel location of the 3-D MRI image to a cluster, and the distances are distances between the pixel locations and the cluster centers; and
        evaluating the solutions based on the fitness value to determine an end of the search cycle;
    performing image segmentation of the 3-D MRI image based on the centers of the plurality of clusters; and
    displaying the segmented 3-D image.

2. The method of claim 1, wherein
the 3-D MRI image is a 3-D MRI image of a human brain, and
wherein the performing the image segmentation includes segmenting the image into gray matter, white matter, and cerebral spinal fluid regions.

3. The method of claim 2, wherein the 3-D MRI image is obtained by filtering an original MRI image into a 3-D image of intracranial tissue.

4. The method of claim 1, further comprising:
    an onlooker phase including
        every onlooker selecting a source of food with a probability that is related to the fitness value of a food source participated by employed bees;
        selecting a solution based on the probability;
        generating a new solution in a neighborhood of an onlooker bee's current location based on previous mean values;
        evaluating the new solution;
        calculating the fitness value for the new solution based on the membership values and the distances to cluster centers, wherein each of the membership values is determined based on a degree of membership of a pixel location of the 3-D MRI image to a cluster, and the distances are distances between the pixel locations and the cluster centers; and evaluating the new solutions based on the fitness value.

5. The method of claim 4, further comprising:

a scout phase in which at the end of a search cycle, when a number of trials reach a limit, a food source is abandoned by an employed bee and scouts begin a new search to find new solutions randomly.

6. The method of claim 1, wherein in the employed phase, the random number is [0, C], where C is a positive constant number, wherein when C increases from zero to a suitable value, a balance between exploitation and exploitation is improved, and values of C are limited to a maximum value in order to prevent a relatively weak exploration ability.

7. A system for 3-D image segmentation, the system comprising:

processing circuitry configured to obtain at least one 3-D Magnetic Resonance Image (MRI) image having a plurality of pixels, perform, in an employee phase, at least one search cycle comprising:

generating a plurality of solutions in a neighborhood of an employed bee's current location, taking into account (a) movement of the employed bee's current location toward a mean value of a positive direction of a global best location and a positive direction of its own best location, wherein the bee's current location is a location of a pixel of the 3-D MRI image and the global best location is a center of a cluster, (b) movement of the employed bee's current location toward the mean value of the positive direction of its own best location and a negative direction of the global best location, and (c) a random number, calculating a fitness value for each of the plurality of solutions based on membership values and distances to the cluster centers, wherein each of the membership values is determined based on a degree of membership of the pixel location of the 3-D MRI image to a cluster, and the distances are distances between the pixel locations and the cluster centers, and evaluating the solution based on the fitness value to determine an end of the search cycle, perform image segmentation of the 3-D MRI image based on centers of the plurality of clusters; and a display device displaying the segmented 3-D image.

8. The system of claim 7, wherein the 3-D MRI image is a 3-D MRI image of a human brain, and wherein in the perform the image segmentation function the processing circuitry is further configured to segment the image into gray matter, white matter, and cerebral spinal fluid regions.

9. The system of claim 8, wherein the 3-D MRI image is obtained by filtering, by the processing circuitry, an original MRI image into a 3-D image of intracranial tissue.

10. The system of claim 7, wherein the processing circuitry is further configured to:

in an onlooker phase, every onlooker selects a source of food with a probability that is related to the fitness value of a food source participated by employed bees, selects a solution based on the probability, generates a new solution in a neighborhood of an onlooker bee's current location based on previous mean values, evaluates the new solution, calculates the fitness value for the new solution based on the membership values and the distances to cluster centers, wherein each of the membership values is determined based on a degree of membership of a pixel location of the 3-D MRI image to a cluster, and the distances are distances between the pixel locations and the cluster centers, and evaluates the new solutions based on the fitness value.

11. The system of claim 10, wherein the processing circuitry is further configured, in a scout phase in which at the end of each search cycle, when a number of trials reach a limit, a food source is abandoned by an employed bee and scouts begin a new search to find new solutions randomly.

12. The system of claim 7, wherein the processing circuitry is further configured, in the employed phase, the random number is [0, C], where C is a positive constant number, wherein when C increases from zero to a suitable value, a balance between exploitation and exploitation is improved, and values of C are limited to a maximum value in order to prevent a relatively weak exploration ability.

13. A non-transitory computer readable storage medium storing processing instructions, which when performed by processing circuitry, performs 3-D image segmentation comprising steps of:

obtaining at least one 3-D Magnetic Resonance Image (MRI) image having a plurality of pixels;

an employee phase including performing at least one search cycle comprising:

generating a plurality of solutions in a neighborhood of an employed bee's current location, taking into account (a) movement of the employed bee's current location toward a mean value of a positive direction of a global best location and a positive direction of its own best location, wherein the bee's current location is a location of a pixel of the 3-D MRI image and the global best location is a center of a cluster, (b) movement of the employed bee's current location toward the mean value of the positive direction of its own best location and a negative direction of the global best location, and (c) a random number;

calculating a fitness value for each of the plurality of solutions based on membership values and distances to the cluster centers, wherein each of the membership values is determined based on a degree of membership of the pixel location of the 3-D MRI image to a cluster, and the distances are distances between the pixel locations and the cluster centers; and evaluating the solution based on the fitness value to determine an end of the search cycle;

performing image segmentation of the 3-D MRI image based on centers of the plurality of clusters; and displaying the segmented 3-D image.

14. The non-transitory computer readable storage medium of claim 13, wherein the 3-D MRI image is a 3-D MRI image of a human brain, and wherein the performing the image segmentation includes segmenting the image into gray matter, white matter, and cerebral spinal fluid regions.

15. The non-transitory computer readable storage medium of claim 14, wherein the 3-D MRI image is obtained by filtering an original MRI image into a 3-D image of intracranial tissue.

16. The non-transitory computer readable storage medium of claim 13, further comprising:
- an onlooker phase including
  - every onlooker selecting a source of food with a probability that is related to the fitness value of a food source participated by employed bees;
  - selecting a solution based on the probability;
  - generating a new solution in a neighborhood of an onlooker bee's current location based on previous mean values;
  - evaluating the new solution;
  - calculating the fitness value for the new solution based on the membership values and the distances to cluster centers, wherein each of the membership values is determined based on a degree of membership of a pixel location of the 3-D MRI image to a cluster, and the distances are distances between the pixel locations and the cluster centers; and
  - evaluating the new solutions based on the fitness value.

17. The non-transitory computer readable storage medium of claim 16, further comprising:
- a scout phase in which at the end of each search cycle, when a number of trials reach a limit, a food source is abandoned by an employed bee and scouts begin a new search to find new solutions randomly.

18. The non-transitory computer readable storage medium of claim 13, wherein in the employed phase,
- the random number is [0, C], where C is a positive constant number, wherein
- when C increases from zero to a suitable value, a balance between exploitation and exploitation is improved,
- and values of C are limited to a maximum value in order to prevent a relatively weak exploration ability.

* * * * *